(12) United States Patent
Girouard

(10) Patent No.: US 6,851,445 B2
(45) Date of Patent: Feb. 8, 2005

(54) PRESSURE RELIEF DEVICE

(75) Inventor: Erick Girouard, Guelph (CA)

(73) Assignee: Teleflex GFI Control Systems L.P., Kitchener ( * ) Notice: Subject to any disclaimer, the term of this patent is extended or adjusted under 35 U.S.C. 154(b) by 0 days.

(21) Appl. No.: 10/420,855

(22) Filed: Apr. 23, 2003

(65) Prior Publication Data

US 2003/0221720 A1 Dec. 4, 2003

Related U.S. Application Data

(60) Provisional application No. 60/374,496, filed on Apr. 23, 2002.

(51) Int. Cl.$^7$ .............................................. F16K 17/38
(52) U.S. Cl. ........................... 137/74; 137/79; 220/89.4
(58) Field of Search ..................... 137/74, 79; 220/89.4

(56) References Cited

U.S. PATENT DOCUMENTS

| | | |
|---|---|---|
| 47,076 A | 3/1865 | Smith |
| 195,367 A | 9/1877 | Hiller |
| 1,211,173 A | 1/1917 | King |
| 1,303,248 A | 5/1919 | Breidenbach |
| 1,636,065 A | 7/1927 | Mueller et al. |
| 1,744,977 A | 1/1930 | Lovekin |
| 1,781,027 A | 11/1930 | Mapes |
| 1,876,938 A | 9/1932 | Home |
| 1,924,417 A | 8/1933 | Ryan |
| 1,944,518 A | 1/1934 | Lovekin et al. |
| 1,960,272 A | 5/1934 | Lovekin |
| 1,984,375 A | 12/1934 | Johnston |
| 2,020,075 A | 11/1935 | Meagher |
| 2,040,776 A | 5/1936 | Marvin |
| 2,133,461 A | 10/1938 | McAbee |
| 2,194,541 A | 3/1940 | Buttner |
| 2,356,283 A | 8/1944 | Steins |
| 2,580,426 A | 1/1952 | Heigis |

(List continued on next page.)

FOREIGN PATENT DOCUMENTS

| | | |
|---|---|---|
| GB | 367731 | 2/1932 |
| GB | 504257 | 4/1939 |
| GB | 715109 | 9/1954 |
| GB | 1068645 | 5/1967 |
| GB | 2265439 | 9/1993 |
| JP | 62-37700 | 3/1987 |
| JP | 2000310346 | 11/2000 |

OTHER PUBLICATIONS

International Search Report (5 pages), PCT/CA03/00598, dated Aug. 1, 2003.

*Primary Examiner*—Ramesh Krishnamurthy

(57) ABSTRACT

A pressure relief device having a housing including an inlet, an outlet, and an inner wall defining a bore connecting the inlet and the outlet. The inlet is in communication with a fluid under pressure in a pressure vessel. The bore includes an inlet portion extending from the inlet toward the outlet, and an outlet portion extending from the outlet toward the inlet. The bore also includes a tapered portion connecting the inlet portion and the outlet portion. The inlet portion has a diameter which is less than the outlet portion's diameter. A plug is located in the bore and movable from a closed position, in which flow of fluid through the bore is blocked, to an open position, in which flow of the fluid through the bore is permitted in response to a pressure differential between the inlet and the outlet.

13 Claims, 20 Drawing Sheets

U.S. PATENT DOCUMENTS

| | | |
|---|---|---|
| 2,671,461 A | 3/1954 | Hebert |
| 2,697,915 A | 12/1954 | Chisholm |
| 2,743,036 A | 4/1956 | Wachtell |
| 3,001,536 A | 9/1961 | Casey |
| 3,008,479 A | 11/1961 | Mancusi, Jr. |
| 3,010,520 A | 11/1961 | Seaberg |
| 3,036,593 A | 5/1962 | Saville |
| 3,040,764 A | 6/1962 | Feinberg |
| 3,101,188 A | 8/1963 | Newmiller et al. |
| 3,101,733 A | 8/1963 | Lord |
| 3,255,824 A | 6/1966 | Rodgers |
| 3,263,929 A | 8/1966 | Seablom |
| 3,472,427 A | 10/1969 | Schaefer |
| 3,491,783 A | 1/1970 | Linsalato |
| 3,554,227 A | 1/1971 | Yocum |
| 3,559,668 A | 2/1971 | Crossman |
| 3,618,627 A | 11/1971 | Wagner |
| 3,633,596 A | 1/1972 | Gerber |
| 3,730,204 A | 5/1973 | Bissett |
| 3,791,450 A | 2/1974 | Poitras |
| 3,811,457 A | 5/1974 | Crossman |
| 3,827,449 A | 8/1974 | Gurizzan et al. |
| 3,842,853 A | 10/1974 | Kelly et al. |
| 3,896,835 A | 7/1975 | Wicke |
| 3,906,976 A | 9/1975 | Nohr et al. |
| 4,006,780 A | 2/1977 | Zehr |
| 4,059,125 A | 11/1977 | Sugimura et al. |
| 4,064,890 A | 12/1977 | Collins et al. |
| 4,083,187 A | 4/1978 | Nagashima |
| 4,085,860 A | 4/1978 | Hawkins et al. |
| 4,195,745 A | 4/1980 | Roberts et al. |
| 4,197,966 A | 4/1980 | Wadensten et al. |
| 4,221,231 A | 9/1980 | Harvey et al. |
| 4,228,858 A | 10/1980 | Sclafani |
| 4,335,734 A | 6/1982 | Trinkwalder |
| 4,352,365 A | 10/1982 | Boccardo et al. |
| 4,365,643 A | 12/1982 | Masclet et al. |
| 4,403,627 A | 9/1983 | Bradley |
| 4,407,432 A | 10/1983 | Shichman |
| 4,430,392 A | 2/1984 | Kelley et al. |
| 4,431,716 A | 2/1984 | Eppley et al. |
| 4,503,675 A | 3/1985 | Gardner et al. |
| 4,609,005 A | 9/1986 | Upchurch |
| 4,732,188 A | 3/1988 | Gabrlik et al. |
| 4,744,382 A | 5/1988 | Visnic et al. |
| 4,744,383 A | 5/1988 | Visnic et al. |
| 4,800,948 A | 1/1989 | Visnic |
| 4,896,690 A | 1/1990 | Taylor |
| 4,922,944 A | 5/1990 | Mueller et al. |
| 5,048,554 A | 9/1991 | Kremer |
| 5,161,738 A | 11/1992 | Wass |
| 5,197,671 A | 3/1993 | Wass et al. |
| 5,213,128 A | 5/1993 | Baird |
| 5,223,347 A | 6/1993 | Lhymn et al. |
| 5,255,809 A | 10/1993 | Ervin et al. |
| 5,275,194 A | 1/1994 | Gray, Jr. |
| 5,400,817 A | 3/1995 | Voss et al. |
| 5,435,333 A | 7/1995 | Duvall |
| 5,495,865 A | 3/1996 | Wass et al. |
| 5,511,576 A | 4/1996 | Borland |
| 5,632,297 A | 5/1997 | Sciullo et al. |
| 5,647,390 A | 7/1997 | Wass |
| 5,743,285 A | 4/1998 | Shalkevich |
| 5,762,091 A * | 6/1998 | Sarne et al. .................. 137/74 |
| 5,791,367 A | 8/1998 | Hackman et al. |
| 5,941,269 A | 8/1999 | Ingle |
| 6,112,760 A | 9/2000 | Scott et al. |
| 6,125,872 A | 10/2000 | Cunkelman et al. |

* cited by examiner

PRESSURE RELIEF DEVICE

FIELD OF THE INVENTION

This invention relates to pressure relief devices for relieving pressure on a fluid in a pressure vessel.

BACKGROUND OF THE INVENTION

Pressure relief devices for use with fluids held under pressure in various pressure vessels are known. Typically, a pressure relief device includes a plug positioned in a passage within a housing attached to a pressure vessel, with the plug normally in a closed position. An inlet of the passage is in communication with the fluid in the pressure vessel when the plug is closed. In a conventional pressure relief device, the plug blocks the flow of the fluid through the passage when the plug is in the closed position, and the plug is movable to an open position in which the fluid can exit the pressure vessel via the passage.

The conventional pressure relief device is intended to relieve excess pressure to which the fluid in a pressure vessel is subjected or, alternatively, to release the fluid in the event of fire. Such excess pressure may be caused, for example, by a fire. However, fire does not always result in excess pressure. For example, where a pressure vessel is holding fluid at only one-half maximum nominal pressure, a fire may not raise the pressure beyond the maximum nominal pressure. In these circumstances, however, the fire would weaken the tank wall, resulting in a dangerous situation. Known pressure relief devices are designed to function in the event that a fire breaks out at or near the pressure vessel, resulting in a risk of explosion or collapse of the pressure vessel.

It is important that the pressure relief device opens quickly when conditions require. In a typical temperature-controlled pressure relief device, the plug is maintained in the closed position by a fusible alloy with a relatively low melting point. The fusible alloy melts when the fusible alloy is exposed to temperatures equal to or greater than its melting point, for example, upon a fire breaking out in the vicinity of the pressure vessel. After the fusible alloy has melted, the plug can be moved to the open position.

In many known pressure relief devices, a spring is used to urge the plug to the open position. The spring is intended to cause the plug to move quickly from the closed position to the open position when the fusible alloy has melted. Also, the spring has the additional purpose of ensuring that the plug moves completely to the open position, and does not become lodged at a partly open position in which the passage is partially blocked. Partial blockage is undesirable because it would impede the flow of fluid through the passage. An example of a spring being used to urge a plug to an open position is disclosed in U.S. Pat. No. 2,194,541 (Buttner) (see FIGS. 1 and 3 therein).

However, known pressure relief devices suffer from a number of defects. For example, because the pressure relief device typically remains in the closed position for an extended period of time, the fusible alloy may creep (i.e., deform over time under stress) because of the stress imposed on the fusible alloy by the pressure force from the fluid and/or the spring. Ultimately, creep can result in the plug moving to the open position (or a partly open position). and consequent release of the fluid, in circumstances where release of the fluid is neither necessary nor desirable.

Another defect of conventional pressure relief devices is that, in some devices, the movement of the plug to the open position results in the expulsion of the plug from the pressure relief device at a relatively high velocity. The sudden expulsion of the plug can be dangerous and damaging.

Also, because relatively rapid flow of the fluid through the passage upon the plug moving to the open position is necessary, the path of the flow of the fluid through the passage should be relatively unobstructed. However, conventional pressure relief devices typically include a number of sharp edges or sharp corners in the passage which is opened up when the plug moves to the open position. The sharp edges or sharp corners should be minimized, however, in order to maximize flow when the plug is in the open position.

In addition, known pressure relief devices also tend to have a relatively large number of mechanical parts, so that the risk of failure or malfunctioning of these devices is relatively high. For example, in many known pressure relief devices, a seal member is required in order for the plug to block flow completely when the plug is in the closed position. However, when the plug moves to the open position, the seal member is in the path of the fluid, and the seal member therefore tends to obstruct the fluid flow through the passage in the pressure relief device.

There is therefore a need for an improved pressure relief device.

SUMMARY OF THE INVENTION

It is an object of the invention to provide an improved pressure relief device which obviates or mitigates at least one of the disadvantages of the prior art.

In a broad aspect of the present invention, there is provided a pressure relief device having a housing including an inlet, an outlet, and an inner wall defining a bore connecting the inlet and the outlet. The inlet is in communication with a fluid under pressure in a pressure vessel. The bore includes an inlet portion extending from the inlet toward the outlet, and an outlet portion extending from the outlet toward the inlet. The bore also includes a tapered portion connecting the inlet portion and the outlet portion. The inlet portion has a diameter which is less than the outlet portion's diameter. A plug is located in the bore and movable from a closed position, in which flow of fluid through the bore is blocked, to an open position, in which flow of the fluid through the bore is permitted in response to a pressure differential between the inlet and the outlet. When the plug moves from the closed position to the open position, the plug moves downstream, i.e., to a part of the bore with a diameter larger than the inlet portion diameter.

In another aspect of the present invention, there is provided a pressure relief device having a housing including an inlet, an outlet, and an inner wall defining a bore connecting the inlet and the outlet. The bore provides a passage for flow of fluid between the inlet and the outlet. The inlet has an inlet diameter and the outlet having an outlet diameter. The inlet diameter is smaller than the outlet diameter, and the inlet is in communication with a fluid under pressure in a vessel. The bore includes an outlet portion with an outlet portion diameter greater than the inlet diameter. The outlet portion extends a distance from the outlet toward the inlet. The bore also includes an inlet portion with a diameter substantially equal to the inlet diameter extending a distance from the inlet toward the outlet. Also, the bore includes a tapered portion extending between the inlet portion and the outlet portion, the inner wall in the tapered portion defining a substantially frusto-conical surface.

The pressure relief device also has a plug positioned in the bore and movable from a closed position, in which a flow of the fluid through the passage is blocked, to an open position, in which the flow of the fluid is permitted through the passage in response to a pressure differential between the inlet and the outlet. The plug includes a tapered contact surface generally defining a conical surface. A contact portion of the conical surface is adapted to cooperate with the frusto-conical surface to define one or more voids therebetween when the plug is in the closed position.

The pressure relief device also includes a temperature-sensitive bonding material for bonding the contact portion to the frusto-conical surface, the bonding material being receivable in the void. The bonding material is adapted to release the contact portion upon exposure of the bonding material to a predetermined temperature, so that the plug is movable relative to the frusto-conical surface upon release. The plug is maintained in the closed position by the bonding material until the bonding material is exposed to at least the predetermined temperature. The plug is movable to the open position by the fluid in response to the pressure differential upon the bonding material releasing the contact portion. The plug includes ducts leading from an inlet port on the conical surface to an exit port disposed in an outlet end of the plug disposed proximal to the outlet. The exit port is positioned in the plug to register with the outlet. The net result is that, upon the plug moving to the open position, the inlet is in communication with the outlet through the ducts.

In another of its aspects, the pressure relief device includes an outlet fitting sealably secured in the bore at the outlet. The outlet fitting includes an exit passage with an exit passage diameter, so that the plug is retainable in the bore by the outlet fitting upon movement of the plug to the open position.

In yet another aspect, the invention includes a plug having an upstream end with an upstream end diameter, the upstream end being located proximal to the inlet, and a downstream end with a downstream end diameter, the downstream end being located proximal to the outlet. The downstream end has a diameter greater than the diameter of the upstream end. The bore is adapted to receive the downstream end and the upstream end and to permit movement of the plug toward the outlet to the open position, so that movement of the plug from the closed position to the open position results in the upstream end being spaced apart from the inner wall to create an upstream gap between the inner wall and the plug. The plug includes ducts for permitting flow of fluid therethrough in response to the pressure differential. Each of the ducts has an inlet port in communication with the upstream gap when the plug is in the open position and an exit port disposed in the downstream end of the plug to register with the outlet. The pressure relief device also includes plug positioning means adapted to maintain the plug in the closed position until the plug positioning means is subjected to a trigger condition. The plug positioning means is further adapted to permit movement of the plug to the open position when the plug positioning means is subjected to the trigger condition.

In another alternative aspect, there is provided a pressure relief device having a housing including an inlet, an outlet and an inner wall defining a cavity. The cavity includes a passage for flow of fluid between the inlet and the outlet. The cavity also includes a chamber contiguous with the passage. The inlet is in communication with a fluid under pressure in a pressure vessel. The pressure relief device also includes a plug positioned in the cavity. The plug is movable between a closed position, in which a flow of the fluid through the passage is blocked, and an open position, in which the flow of the fluid is permitted through the passage in response to a pressure differential between the inlet and the outlet. The plug includes a plug contact surface adapted to cooperate with the inner wall to define one or more voids therebetween when the plug is in the closed position. The pressure relief device also includes a temperature-sensitive bonding material receivable in the voids. The bonding material is adapted to release the plug surface upon exposure to a predetermined temperature so that the plug is movable from the closed position to the open position. The bonding material bonds the plug contact surface to the inner wall to maintain the plug in the closed position until the bonding material is exposed to at least the predetermined temperature.

The pressure relief device also includes a biasing means for urging the plug into the open position. The biasing means is resistable by the bonding material until the bonding material is exposed to at least the predetermined temperature. The plus also includes a plug bore for maintaining communication between the inlet and the chamber.

In yet another alternative embodiment, the invention provides a pressure relief device having a housing including an inlet, an outlet and an inner wall defining a cavity. The cavity includes a passage for flow of fluid between the inlet and the outlet and a chamber contiguous with the passage. The inlet is in communication with a fluid under pressure in a pressure vessel. The pressure relief device also includes a plug positioned in the cavity. The plug is movable between a closed position, in which a flow of the fluid through the passage is blocked, and an open position, in which the flow of the fluid is permitted through the passage in response to a pressure differential between the inlet and the outlet. The plug includes a plug surface having a contact surface portion adapted to cooperate with the inner wall to define one or more voids therebetween when the plug is in the closed position. The plug surface also includes a shoulder adapted for directing a pressure force resulting from the pressure differential upon the plug so that the pressure force urges the plug to the open position. The pressure relief device also includes a temperature-sensitive bonding material receivable in the voids. The bonding material is adapted to release the contact surface portion upon exposure to a predetermined temperature so that the plug is movable from the closed position to the open position. The bonding material bonds the contact surface portion to the inner wall to maintain the plug in the closed position until the bonding material is exposed to at least the predetermined temperature. The plug also includes a plug bore for maintaining communication between the outlet and the chamber.

BRIEF DESCRIPTION OF THE DRAWINGS

The invention will be better understood with reference to the drawings, in which.

Parts of structures are shown cut away where necessary for clarity of illustration. Similar parts in all the embodiments are given the same reference number.

DETAILED DESCRIPTION OF THE PREFERRED EMBODIMENT(S)

Figure 1:
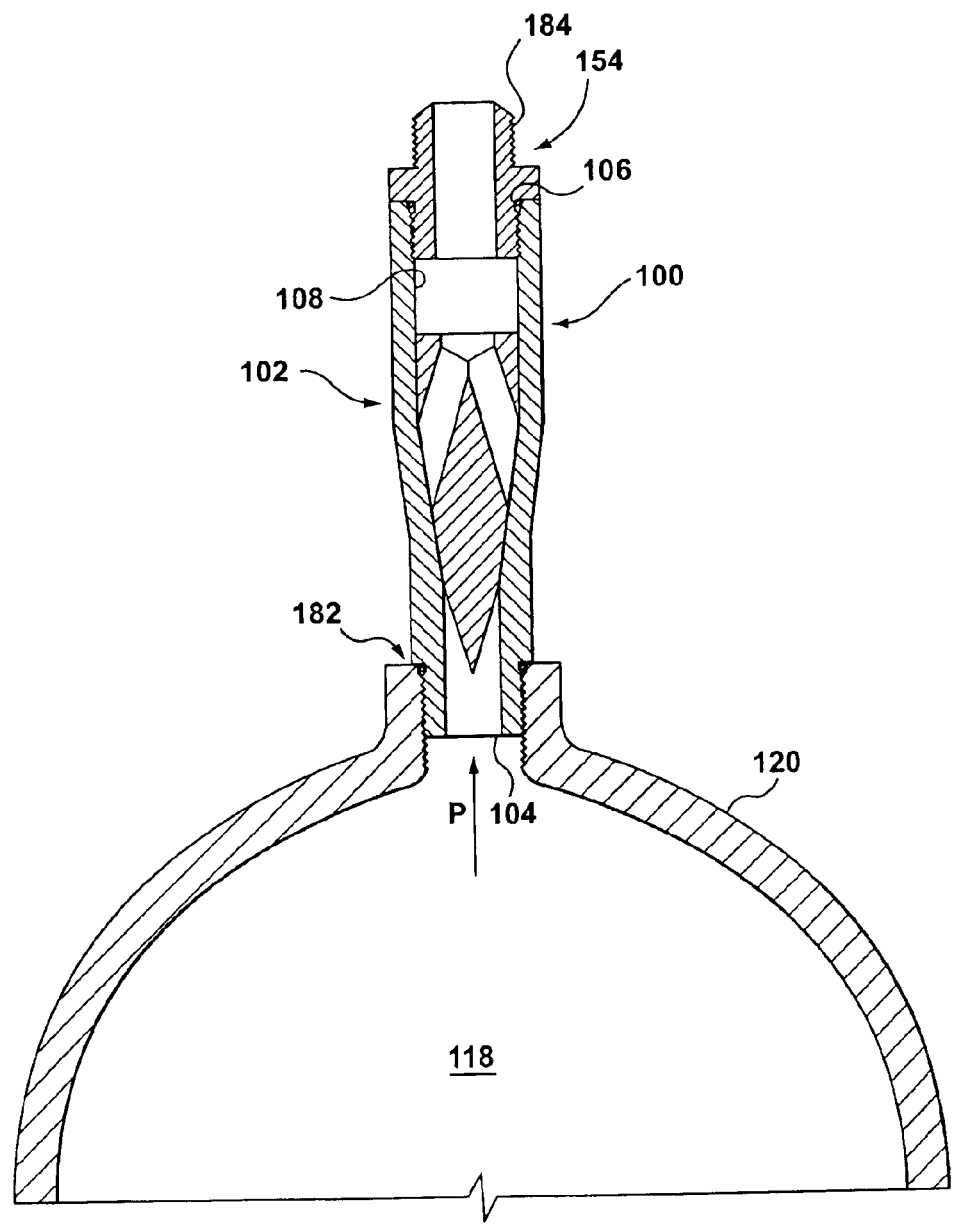
FIG. 1 is a longitudinal section through a preferred embodiment of the pressure relief device attached to a pressure vessel.
Figure 2:
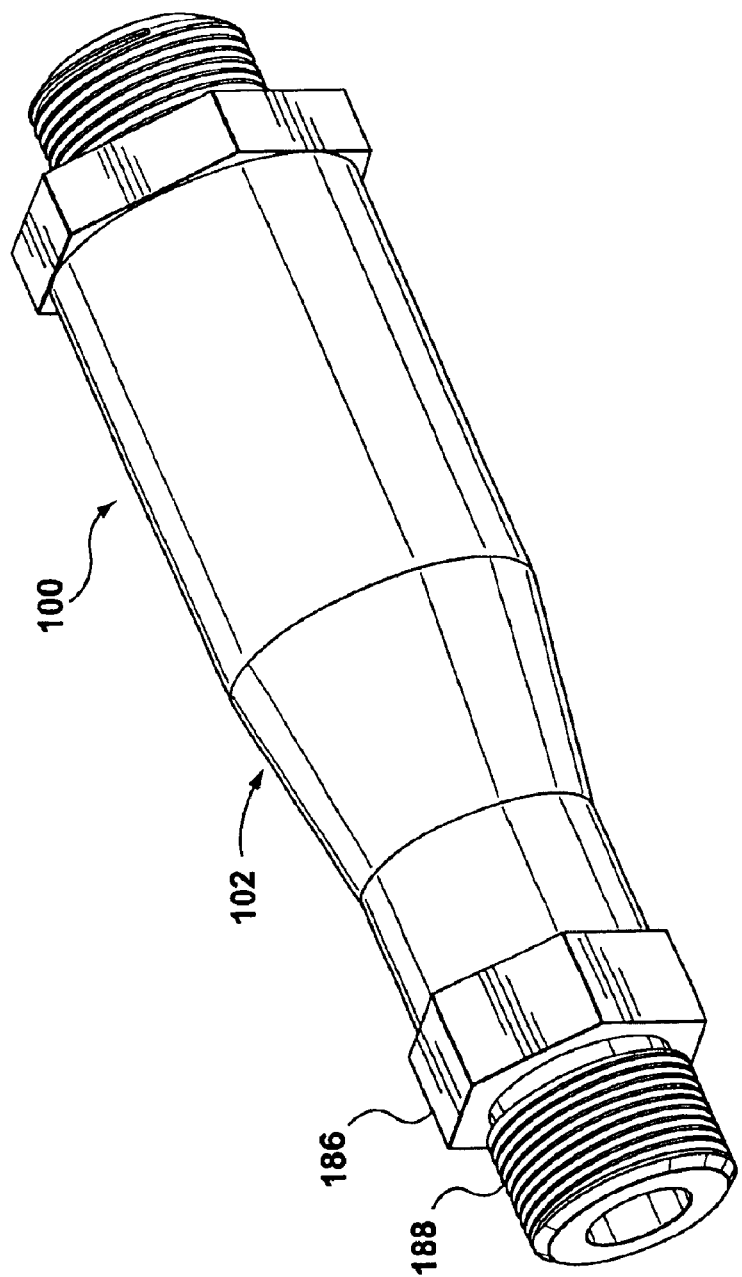
FIG. 2 is an isometric view of pressure relief device of FIG. 1, drawn at a larger scale.

Reference is first made to FIGS. 1–7 to describe a preferred embodiment of a pressure relief device indicated generally by the numeral 100 in accordance with the invention. The pressure relief device 100 includes a housing 102 including an inlet 104, an outlet 106, and an inner wall 108 defining a bore 110 connecting the inlet 104 and the outlet 106. As will be described, the bore 110 provides a passage 112 for flow of fluid between the inlet 104 and the outlet 106.

Figure 3:
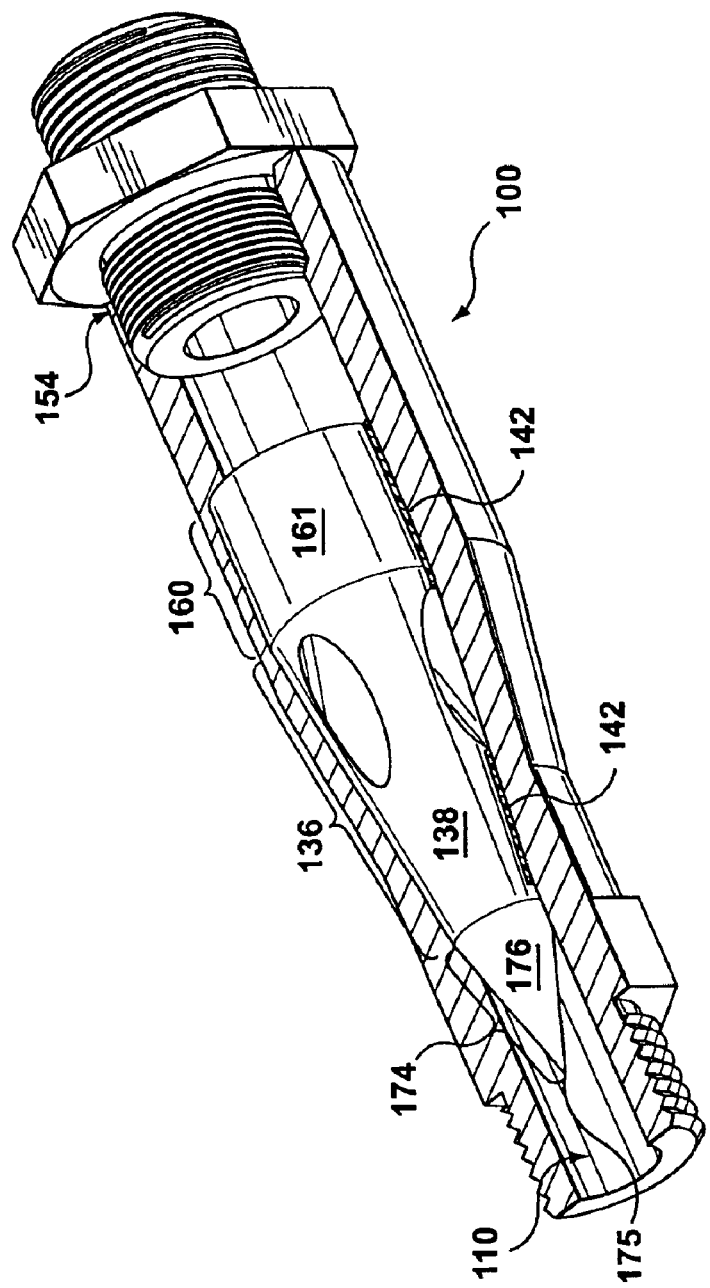
FIG. 3 is a partial cut-away isometric view of the pressure relief device of FIG. 2, showing a plug located in a closed position in a bore inside the housing, with part of the housing shown cut away.
Figure 4:
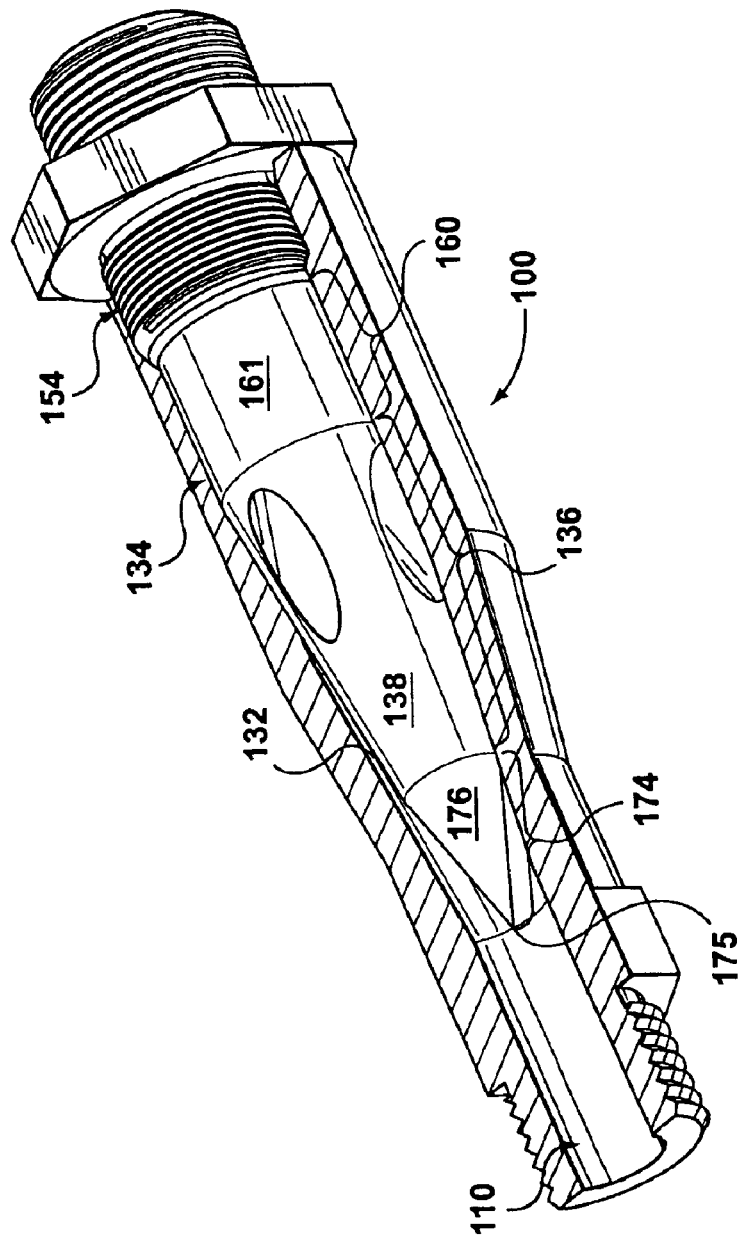
FIG. 4 is a partial cut-away isometric view of the pressure relief device of FIG. 3, showing the plug located in an open position in the bore.
Figure 5:
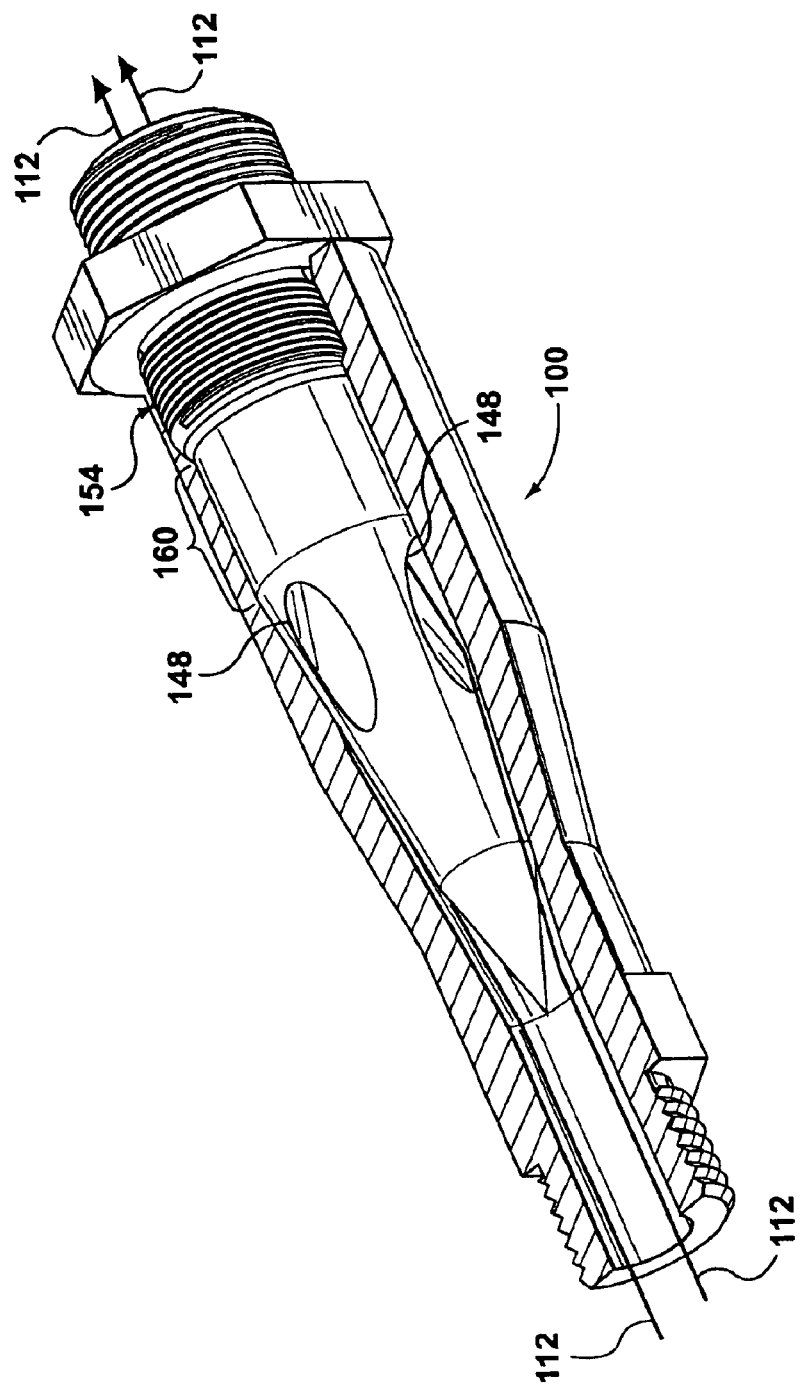
FIG. 5 is a partial cut-away isometric view of the pressure relief device of FIG. 4 showing schematic representations of two idealized paths of a flow of a fluid through ducts in the plug when the plug is in the open position.
Figures 6, 7:
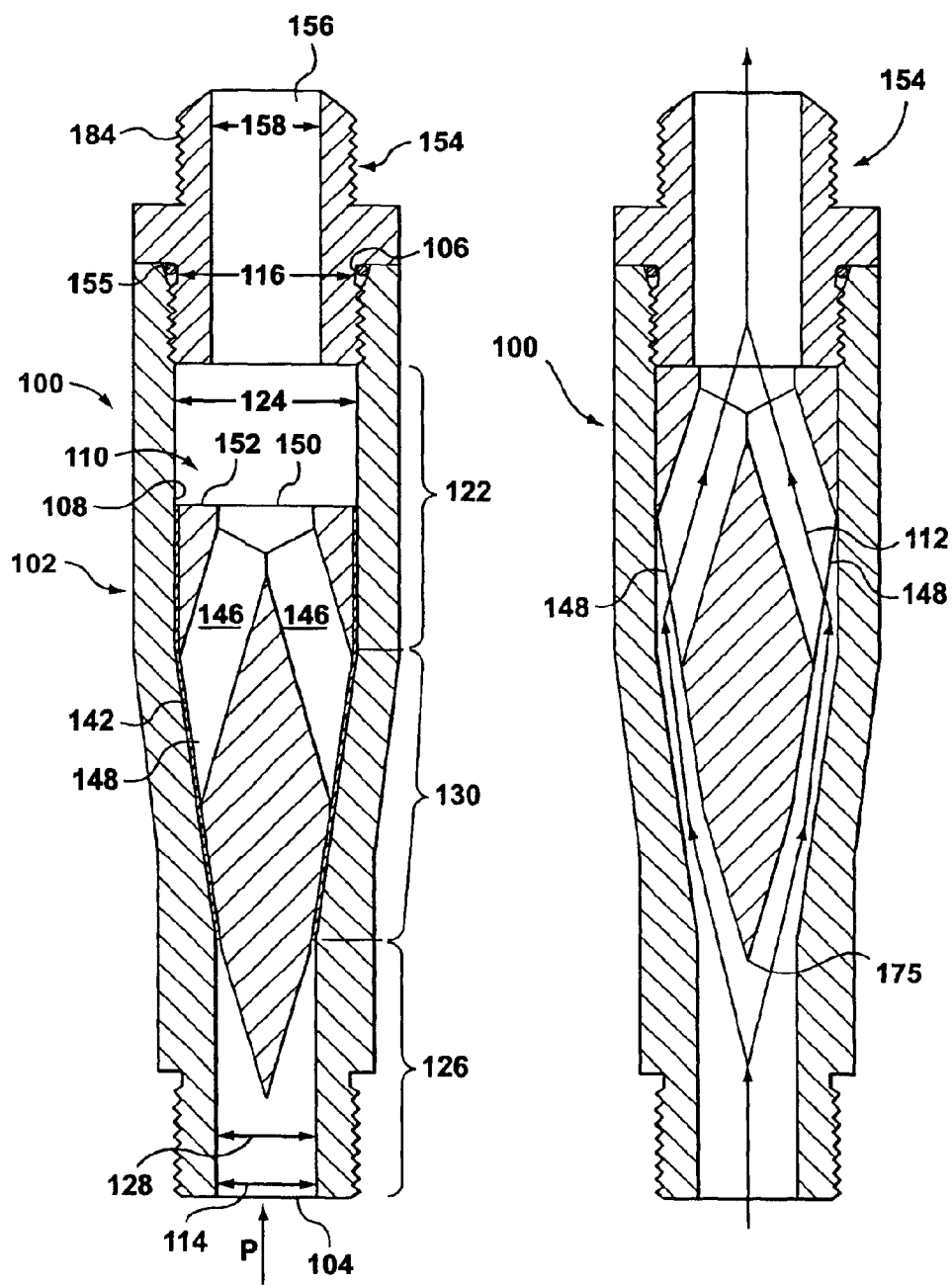
FIG. 6 is a longitudinal section of the pressure relief device of FIG. 3 showing the plug in the closed position, drawn at a larger scale.
FIG. 7 is a longitudinal section of the pressure relief device of FIG. 4 showing the plug in the open position.

As can be seen in FIGS. 6 and 7, the inlet 104 has an inlet diameter 114, and the outlet 106 has an outlet diameter 116. In the preferred embodiment, the inlet diameter 114 is smaller than the outlet diameter 116. The inlet 104 is in communication with a fluid 118 under pressure in a vessel 120 (FIG. 1). Preferably, the bore 110 includes an outlet portion 122 with an outlet portion diameter 124 greater than the inlet diameter 114. The outlet portion 122 extends a distance from the outlet 106 toward the inlet 104. The bore 110 also includes an inlet portion 126 with an inlet portion diameter 128 substantially equal to the inlet diameter 114, and the inlet portion 126 extends a distance from the inlet 104 toward the outlet 106 (FIG. 6). As can be seen in FIGS. 6 and 7, the bore 110 also includes a tapered portion 130 extending between the inlet portion 126 and the outlet portion 122. The inner wall 108 in the tapered portion 130 defines a substantially frusto-conical surface 132 (FIG. 4). The pressure relief device 100 also includes a plug 134 positioned in the bore 110 and movable from a closed position (FIG. 6), in which a flow of the fluid 118 through the passage 112 is blocked, to an open position (FIG. 7), in which the flow of the fluid 118 is permitted through the passage 112 in response to a pressure differential between the inlet 104 and the outlet 106 (FIG. 5). In the preferred embodiment, the plug 134 includes a tapered contact surface 136 generally defining a conical surface (FIGS. 3–4). A contact portion 138 of the contact surface 136 is adapted to cooperate with the frusto-conical surface 132 to define one or more voids 140 (FIGS. 8, 8C) therebetween when the plug 134 is in the closed position.

In addition, the pressure relief device 100 includes a temperature-sensitive bonding material 142 for bonding the contact portion 138 to the frusto-conical surface 132 (FIG. 3). The bonding material 142 is receivable in the void 140 (FIG. 6). As is known in the art, the bonding material 142 is adapted to release the contact portion 138 upon exposure of the bonding material 142 to a predetermined temperature. Accordingly, the plug 134 is movable relative to the frusto-conical surface 132 upon release. In addition, the plug 134 is preferably maintained in the closed position by the bonding material 142 until the bonding material 142 is exposed to at least the predetermined temperature. The plug 134 is movable to the open position by the fluid 118 in response to the pressure differential, upon the bonding material 142 releasing the contact portion 138.

Preferably, the bonding material is a solder or a eutectic alloy. It is also preferred that the predetermined temperature is between approximately 100° C. and approximately 150° C. The pressure which the fluid 118 is normally under in the pressure vessel 120 varies. For example, where the fluid 118 is compressed natural gas ("CNG"), the pressure is normally at approximately 3,600 psi. Where the fluid 118 is hydrogen, the usual pressure may vary from approximately 3,600 psi to approximately 10,000 psi. The pressure at the outlet 106 is approximately atmospheric pressure, when the plug 134 is in the closed position. In view of this, in the preferred embodiment, the pressure differential between the inlet and the outlet is significant when the plug 134 is in the closed position. A pressure force due to the pressure differential is exerted upon the plug 134, and the direction of the pressure force is shown by the arrow "P" (FIG. 1).

As can be seen in FIGS. 3-7, the plug 134 includes ducts 146 disposed therein, and each duct 146 leads from an inlet port 148 on the conical surface 138 to an exit port 150 disposed in an outlet end 152 proximal to the outlet 106. The exit port 150 is positioned in the plug 134 to register with the outlet 106. As a result, upon the plug 134 moving to the open position, the inlet 104 is in communication with the outlet 106 through the ducts 146.

In the preferred embodiment, the pressure relief device 100 additionally includes an outlet fitting 154 sealably secured in the bore 110 at the outlet 106 (FIGS. 3-7). The outlet fitting 154 includes an exit passage 156 having an exit passage diameter 158, as can be seen in FIGS. 6 and 7. The plug 134 is retainable in the bore 110 by the outlet fitting 154 upon movement of the plug 134 to the open position, as shown in FIGS. 4, 5 and 7. Preferably, the exit passage diameter 158 is smaller than the outlet diameter 116 and larger than the inlet diameter 114. The outlet fitting 154 thus prevents the plug 134 from rapidly exiting the bore 110 when the bonding material 142 releases the contact surface 138. Also, the outlet fitting 154 provides a fitting to which an outlet hose (not shown) can be attached.

The outlet fitting 154 can be secured in the outlet 106 by any suitable means. For example, the inner wall 108 can be threaded in the vicinity of the outlet 106 to mate with threads (not shown) on the outlet fitting 154. In order to sealably secure the outlet fitting 154 in the passage 112, a sealing member 155 is positioned between the outlet fitting 154 and the inner wall 108.

In the preferred embodiment, the outlet end 152 includes a guide portion 160 adapted for guiding the plug 134 from the closed position to the open position. The guide portion 160 is intended to cause the exit port 150 to register with the exit passage 156 when the plug 134 is in the open position.

As can be seen in FIGS. 3 and 6, in the preferred embodiment, the guide portion 160 has a guide portion surface 161 which cooperates with the inner wall 108 to form one or more voids 140 in which bonding material 142 is receivable.

It is also preferred that the bore 110 defines a longitudinal axis 162 (FIG. 8), and the inlet 104 and the outlet 106 are coaxial with the longitudinal axis 162. Preferably, the ducts 146 are positioned for minimal deviation of flow of the fluid 118 through the passage 112 from a direction parallel to the longitudinal axis 162 when the plug 134 is in the open position.

Figures 8, 8A, 8B, 8C:
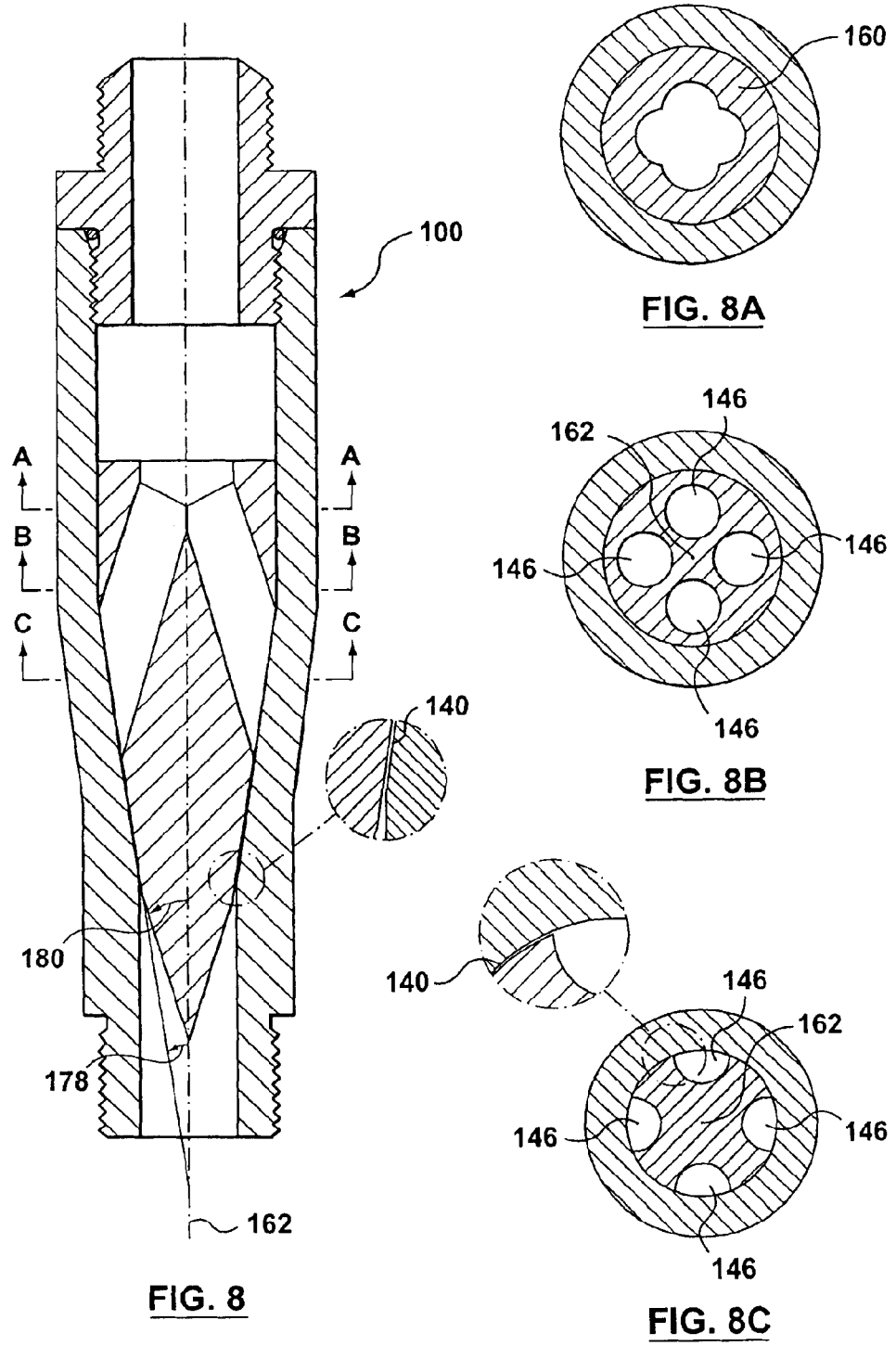
FIG. 8 is a partially magnified longitudinal section of the pressure relief device of FIG. 6, showing a longitudinal axis.
FIG. 8A is a cross-section of the pressure relief device of FIG. 8 taken along line A—A in FIG. 6.
FIG. 8B is a cross-section of the pressure relief device of FIG. 8 taken along line B—B in FIG. 6.
FIG. 8C is a partially magnified cross-section of the pressure relief device of FIG. 8 taken along line C—C in FIG. 6.

As can be seen in FIG. 8, the plug 134 is preferably configured to be coaxial with the longitudinal axis 162. As shown in FIGS. 8A–8C, in the preferred embodiment, the plug 134 includes four ducts 146 with respective inlet ports 148 disposed angularly equidistant from each other around the longitudinal axis 162.

Preferably, the plug 134 includes a cone portion 174 having a point 175 and an upstream cone surface 176 (FIGS. 3 and 4). In the preferred embodiment, the tapered contact surface 136 is positioned at a first angle 178 relative to the longitudinal axis 162, and the upstream cone surface 176 is positioned at a second angle 180 relative to the longitudinal axis 162 (FIG. 8). As can be seen in FIG. 8, it is preferred that the second angle 180 is greater than the first angle 178 in order that the point 175 be positioned as far as possible downstream. This is likely to result in relatively less disruption in the flow of the fluid 118 through the passage 112 when the plug 134 is in the open position. The extent to which the cone portion 174 results in locating the point 175 downstream when the plug 134 is in the open position is shown in FIG. 7. Although the point 175 is located relatively far upstream in the inlet portion 126 when the plug 134 is in the closed position (FIG. 6), in comparison, the point 175 is located close to the tapered portion 130 when the plug 134 is in the open position (FIG. 7).

In use, the pressure relief device is sealably secured to the pressure vessel 120 at a fitting 182 adapted for the purpose, as is known in the art (FIG. 1). Also, the outlet hose is attached to the outlet fitting 154 at an extension 184 adapted for the purpose, as is known in the art. The pressure relief device 100 preferably includes a suitable fastener 186 and fitting 188, as is known in the art (FIG. 2), for securing the pressure relief device 100 to the pressure vessel 120.

The plug 134 is maintained in the closed position by the bonding material 142, as shown in FIGS. 3 and 6. The bonding material 142 serves as the seal as well, i.e. between the frusto-conical surface 132 and the contact portion 138. Upon the bonding material 142 releasing the contact portion 138, the plug 134 moves rapidly to the open position, due to the pressure differential between the inlet 104 and the outlet 106. This rapid movement is greatly facilitated by the widening of the bore 110 in the tapered portion 130, i.e., between the inlet portion 126 and the outlet portion 122. Because of the widening of the bore 110 in the tapered portion 130, relatively rapid movement of the plug 134 to the open position is made easier. Also, because of the shape of the tapered portion 130, the risk that the plug 134 will become lodged in a partially-opened position (i.e., between the closed position and the open position) is relatively low.

The outlet end 152 serves to guide the plug 134 along the outlet portion 122 until the plug 134 reaches the open position.

Schematic flow paths of the fluid 118 through the passage 112 (the passage 112 comprising inlet portion 126, the ducts 146, and the exit passage 156 when the plug 134 is in the open position) are shown in FIGS. 5 and 7. As shown in FIG. 7, the ducts 146 are positioned for minimal deviation of the flow of the fluid 118 through the passage 112.

As described above, the cone portion 174 is configured to minimize disruption to the flow of the fluid 118. The inlet ports 148 are positioned as close to the point 175 as is feasible without weakening or undermining the seal created by the bonding material 142. Also, the ducts 146 and the exit port 150 are preferably positioned relative to each other to define a path for the flow of the fluid 118 which deviates from the longitudinal axis 162 to the least extent practicable. Sharp edges and sharp corners are also avoided to the extent possible.

Preferably, the cross-sectional area of the passage 112 when the plug 134 is in the open position gradually increases. in general, in the downstream direction between the inlet 104 and the exit passage 156. This is preferable because the increasing flow area tends to decrease impediments to flow of the fluid 118 through the passage 112.

Additional embodiments of the invention are shown in FIGS. 9–27. In FIGS. 9–27, elements are so numbered as to correspond to like elements shown in FIGS. 1–8C.

Figures 9, 11:
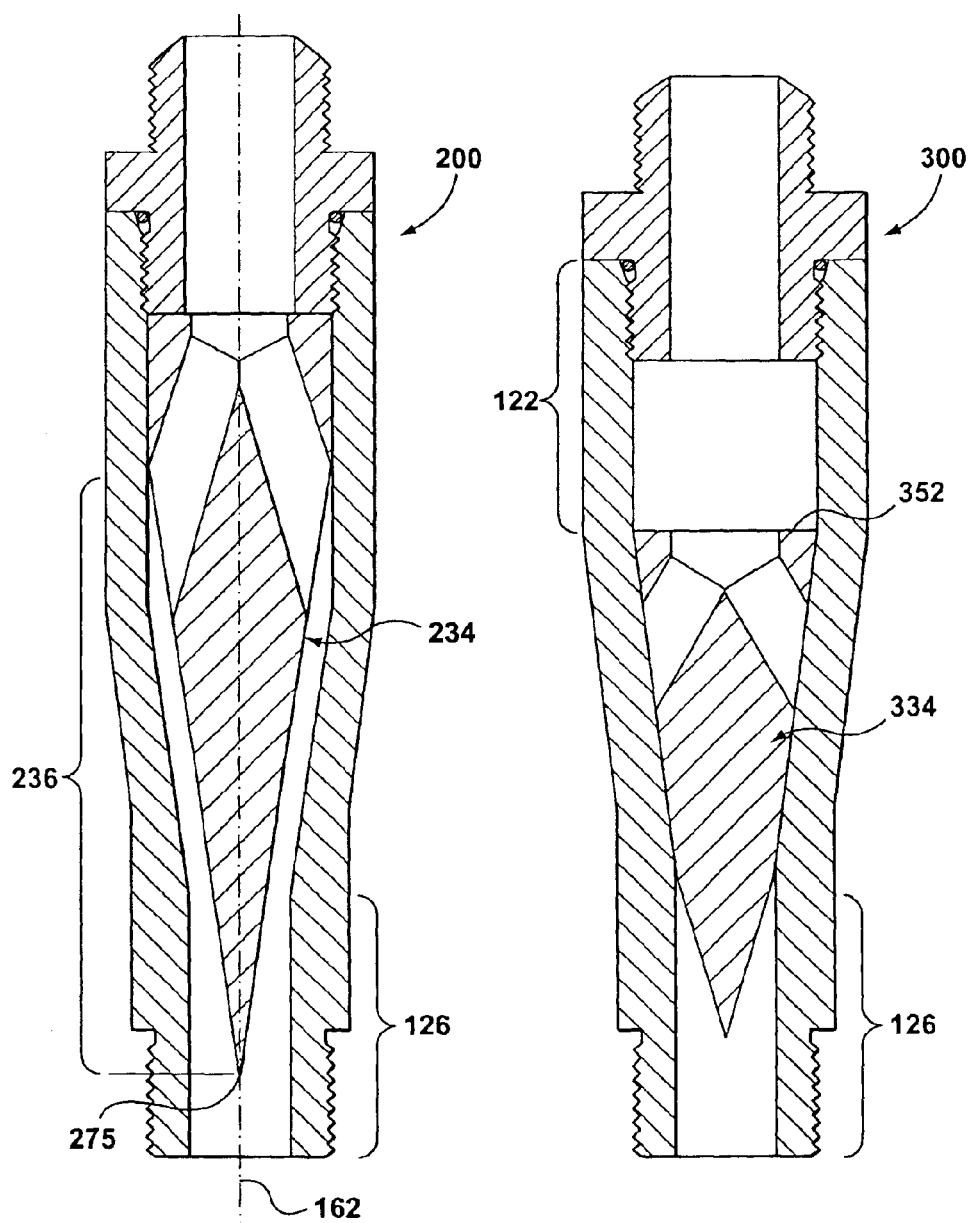
FIG. 9 is a longitudinal section of another embodiment of the pressure relief device showing a plug in an open position, drawn at a smaller scale.
FIG. 11 is a longitudinal section through the pressure relief device of FIG. 10 showing the plug in the open position, drawn at a larger scale.

In FIG. 9, an alternative embodiment 200 of the pressure relief device is shown. The pressure relief device 200 includes a plug 234 (shown in an open position in FIG. 9) in which a tapered contact surface 236 extends to a point 275. The plug 234 therefore does not include a cone portion corresponding to the cone portion 174 of the pressure relief device 100. As can be seen in FIG. 9, the result is that the point 275 extends relatively far into the inlet portion 126. Although the alternative pressure relief device 200 may involve somewhat less cost to manufacture than the preferred embodiment of the pressure relief device 100, the pressure relief device 100 would cause less disruption in the flow of the fluid 118 due to the somewhat flatter profile of the cone portion 174.

Figure 10:
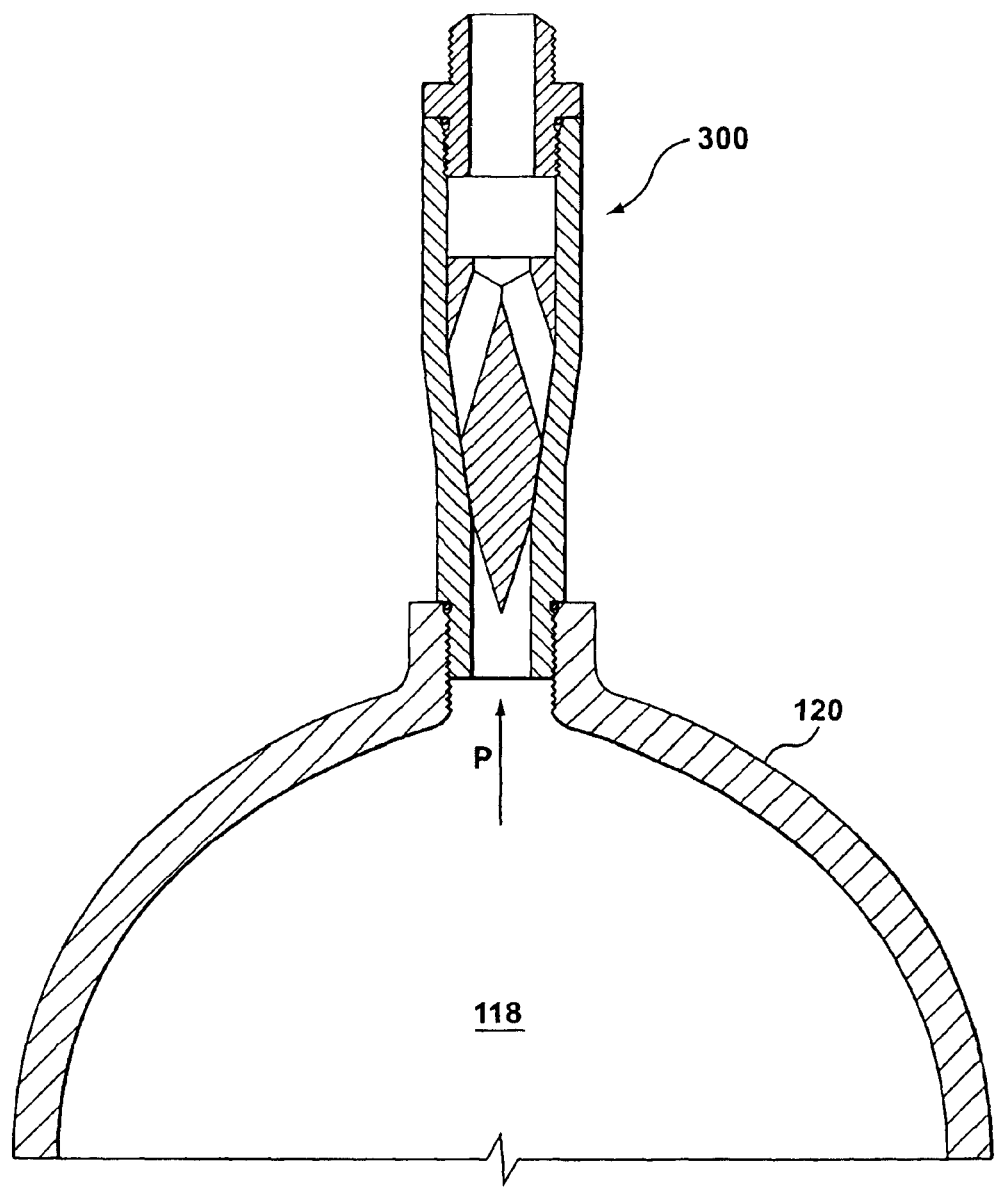
FIG. 10 is a longitudinal section through an alternative embodiment of the pressure relief device attached to a pressure vessel, drawn at a smaller scale.

Another alternative embodiment 300 of the pressure relief device is shown in FIGS. 10 and 11. In FIG. 10, the pressure relief device 300 is shown attached to a pressure vessel 120. The pressure relief device 300 is shown in FIG. 11 including a plug 334 in a closed position in the bore 110. As can be seen in FIG. 11, the pressure relief device 300 does not include a portion corresponding to the guide portion 160 of the pressure relief device 100. Instead, the plug 334 has an outlet end 352. When the plug 334 is moved from the closed position to an open position (not shown), the possibility exists that the plug 334 can be misaligned as the outlet end 352 moves along the outlet portion 122, so that the plug 334 may become lodged in the outlet portion 122, between the closed position and the open position. Thus, the pressure relief device 300 is more likely to malfunction than the pressure relief device 100. However, it will be appreciated by those skilled in the art that the pressure relief device 300 may be somewhat less costly to manufacture than the pressure relief device 100.

Figures 12, 13:
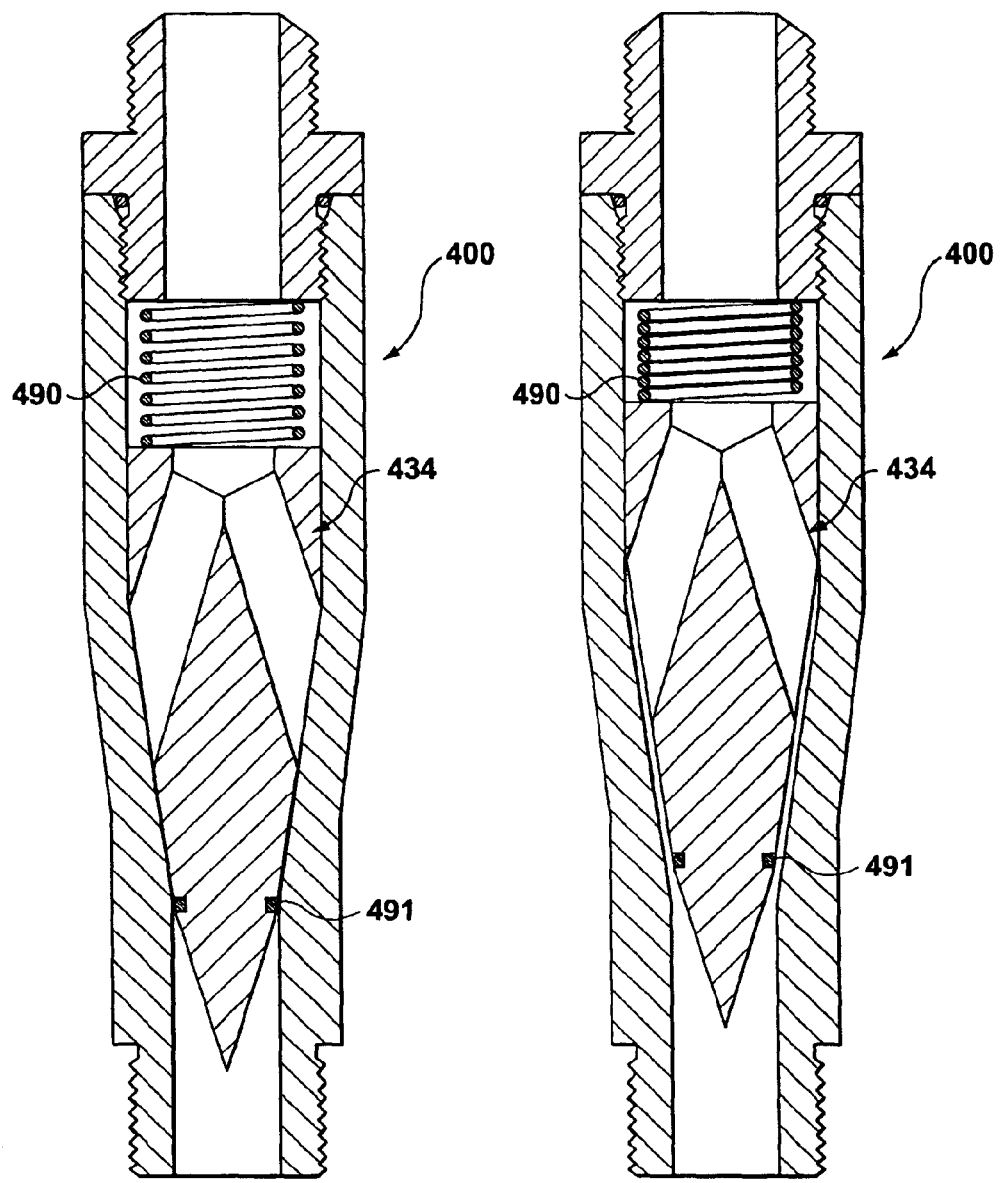
FIG. 12 is a longitudinal section of an alternative embodiment of the pressure relief device, showing a plug in a closed position, drawn at a smaller scale.
FIG. 13 is a longitudinal section of the pressure relief device of FIG. 12, showing the plug in an open position.

Another alternative embodiment 400 of the pressure relief device is shown in FIGS. 12–13. As can be seen in FIG. 12, the pressure relief device 400 includes a plug 434 biased to the closed position by a biasing means 490, such as a spring. Because the plug 434 is not maintained in the closed position by bonding material, a sealing member 491 is positioned in the plug 434 and in the void 140 to seal the void 140 when the plug 434 is in the closed position (FIG. 12). The biasing means 490 is adapted to permit movement of the plug 434 to the open position (FIG. 13) upon a pressure force resulting from the pressure differential exerted on the plug 434 reaching at least a predetermined pressure. When this happens, the plug 434 is movable from the closed position to the open position in response to the pressure force.

It will be appreciated by those skilled in the art that various types of biasing means could be used. For example, the biasing means 490 could be belleville washers, a coil spring, a wave spring, or an elastomeric spring.

Figure 14:
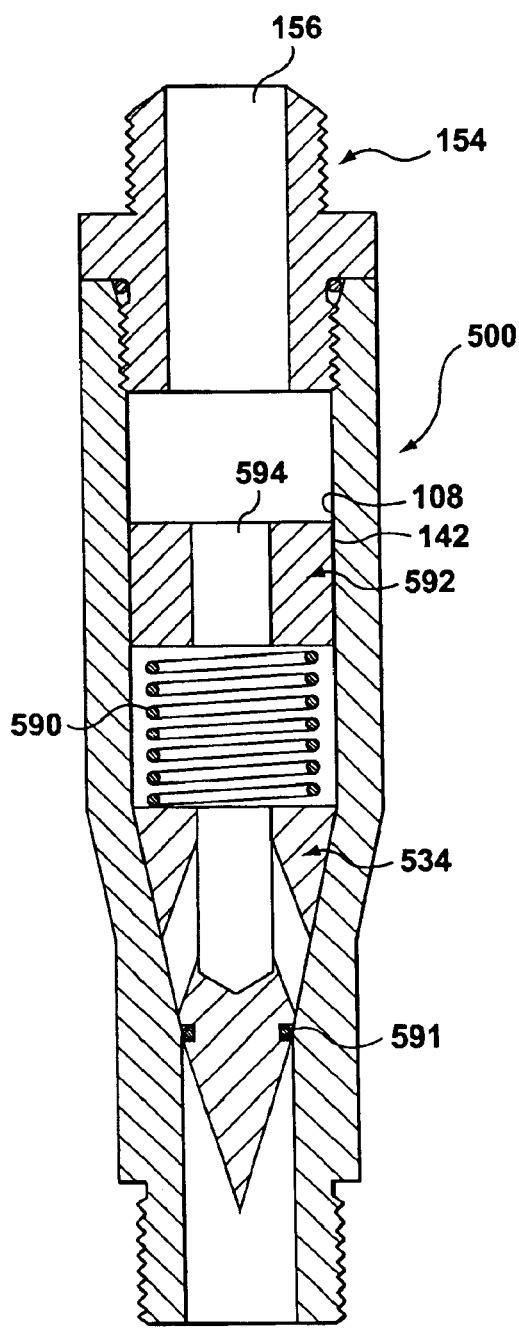
FIG. 14 is a longitudinal section of an alternative embodiment of the pressure relief device, showing a first plug in a closed position.
Figure 15:
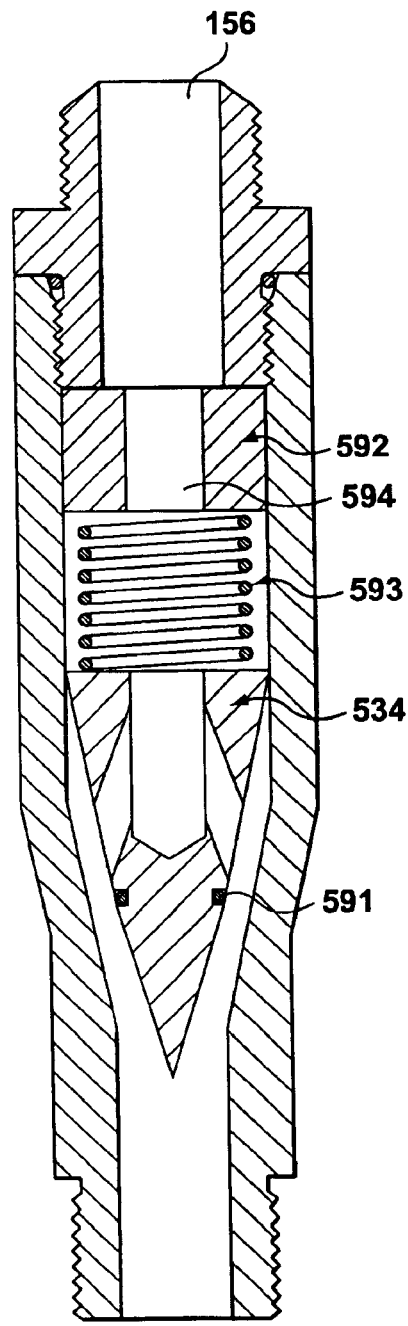
FIG. 15 is a longitudinal section of the pressure relief device of FIG. 14, showing the plug in the open position due to release of the second plug to permit the second plug to move to a downstream position.
Figure 16:
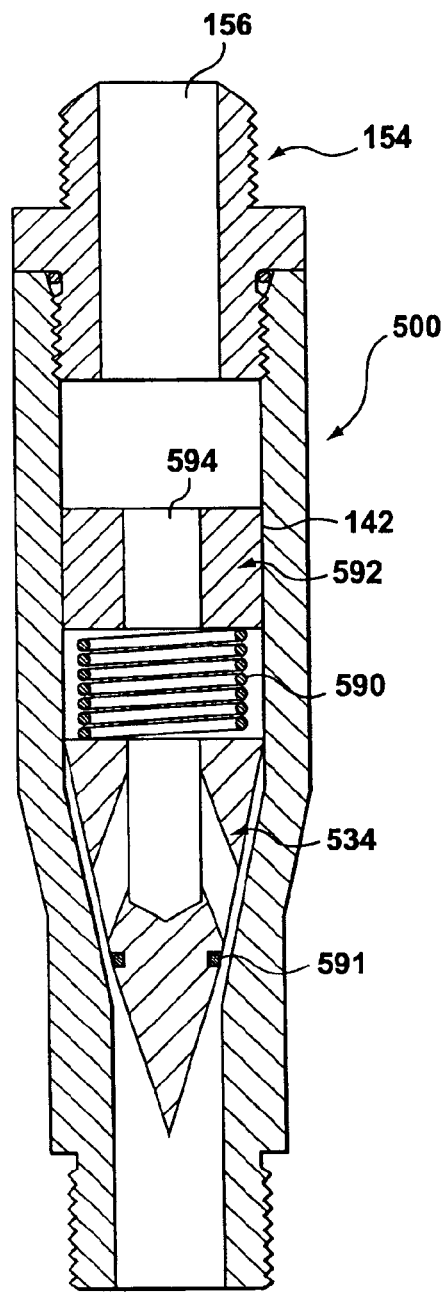
FIG. 16 is a longitudinal section of the pressure relief device of FIG. 14, showing the plug in a first open position due to compression of a spring.

Another alternative embodiment 500 of the pressure relief device is shown in FIGS. 14–16. As can be seen in FIG. 14, the pressure relief device 500 includes a first plug 534 and a second plug 592 positioned between the outlet 106 and the first plug 534. The second plug 592 is attached to the first plug 534 by an attachment portion 593 which is preferably a biasing means 590, as will be described. Preferably, the second plug 592 and the inner wall 108 cooperate to define one or more voids 140 in which bonding material 142 is receivable. The pressure relief device 500 includes a sealing member 591 positioned on the first plug 534 for providing a seal when the plug 534 is in the closed position. The second plug 592 includes a conduit 594 positioned to register with the exit passage 156.

The second plug 592 is movable from an upstream position (FIG. 14), in which the second plug 592 is held stationary relative to the inner wall 108, to a downstream position (FIG. 15) downstream of the upstream position upon release by the bonding material 142, in response to the pressure differential. This movement results in movement of the first plug 534 to the open position. The fluid 118 can then pass through the ducts 146 and through the conduit 594 to the exit passage 156.

As shown in FIG. 16, the first plug 534 can also move to the open position (FIG. 16) even if the second plug 592 remains stationary in the upstream position. The biasing means 690 biases the first plug 534 to the closed position (FIG. 14). However, the biasing means 590 is adapted to permit movement of the first plug 534 to the open position upon a pressure force resulting from the pressure differential exerted on the first plug 534 reaching at least a predetermined pressure.

It will be appreciated by those skilled in the art that the pressure relief device 500 has the advantage that it is responsive to both abnormal increases in temperature (i.e., above the predetermined temperature) and abnormally high pressure (i.e., above the predetermined pressure).

Figure 17:
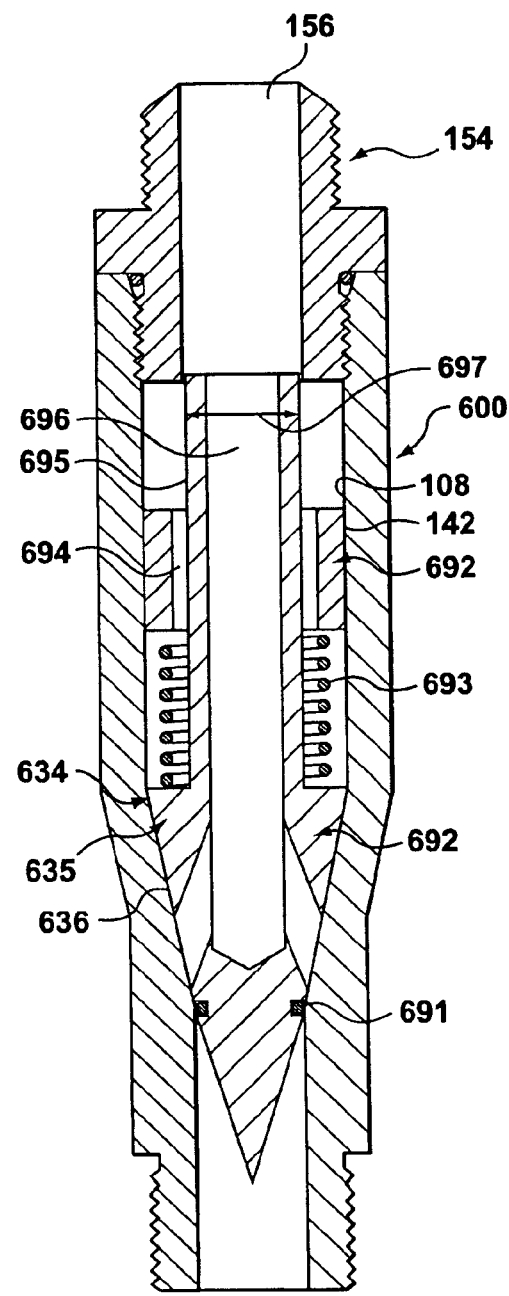
FIG. 17 is a longitudinal section of another alternative embodiment of the pressure relief device showing a plug in a closed position including a tube extending through a second plug in an upstream position, the first plug in a closed position and the second plug being in an upstream position.
Figure 18:
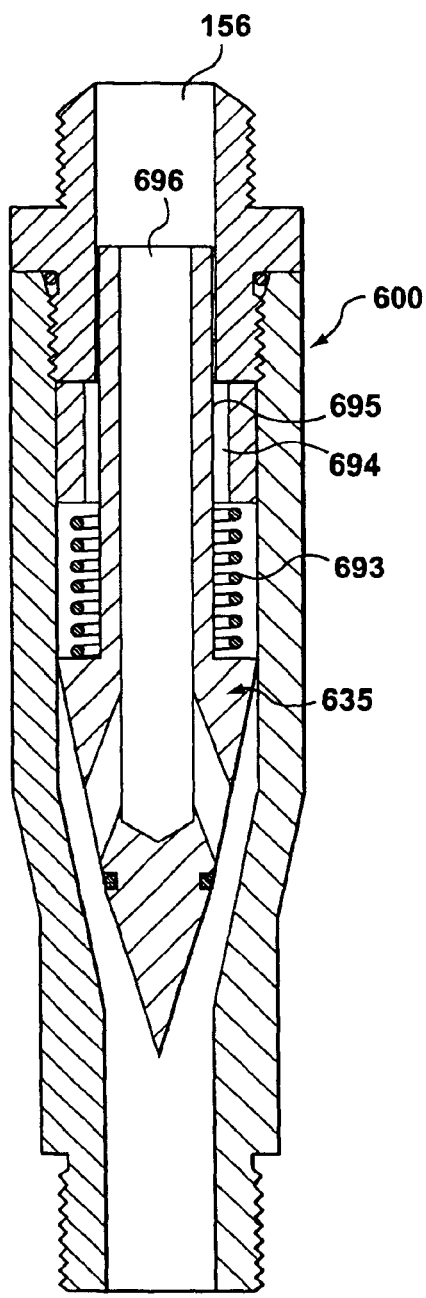
FIG. 18 is a longitudinal section of the pressure relief device of FIG. 17 showing the first plug in an open position and the second plug in a downstream position.
Figure 19:
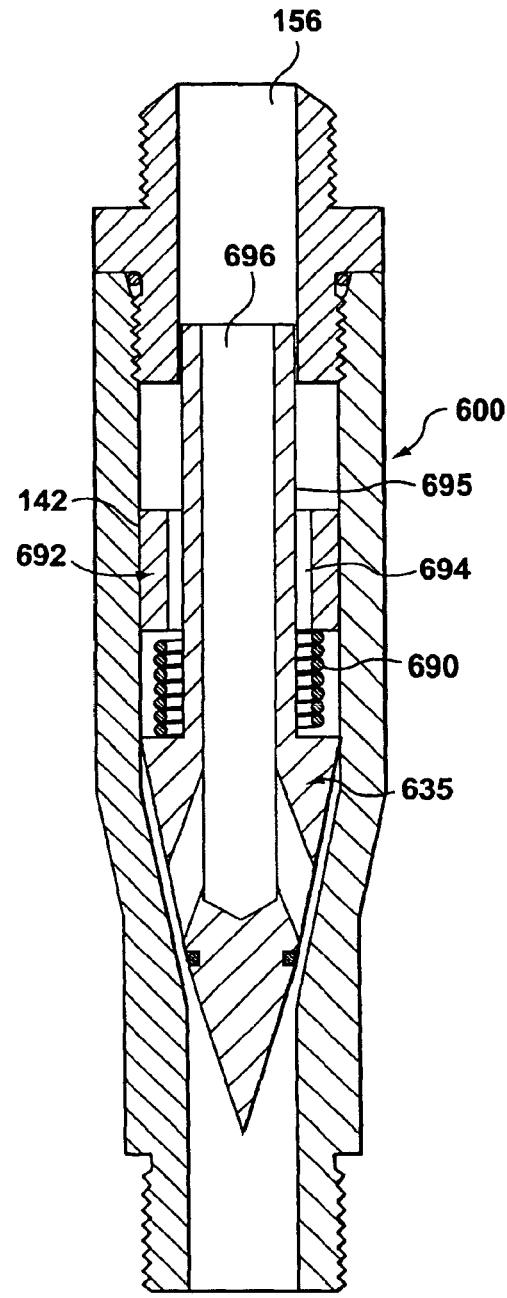
FIG. 19 is a longitudinal section of the pressure relief device of FIG. 17 showing the first plug in an open position due to compression of a spring.

Yet another alternative embodiment 600 of the pressure relief device is shown in FIGS. 17–19. As can be seen in FIG. 17, the pressure relief device 600 includes a first plug 634 having a body 635 with a tapered contact surface 636. The first plug 634 also includes a tubular element 695 extending from the body 635, as will be described. The tubular element 695 includes a tube 696, and the tubular element 695 has an outer diameter 697.

The pressure relief device 600 also includes a second plug 692. The second plug 692 is movable from an upstream position (FIG. 17) to a downstream position (FIG. 18) upon the bonding material 142 releasing the second plug 692. The bonding material 142 maintains the second plug 692 in the upstream position, stationary relative to the inner wall 108, until the bonding material 142 is exposed to the predetermined temperature. The release of the second plug 692 by the bonding material 142 occurs upon exposure of the bonding material to the predetermined temperature.

As can be seen in FIG. 18, upon movement of the second plug 692 to the downstream position, the first plug 634 moves to the open position, because the first plug 634 and the second plug 692 are attached by the attachment portion 693.

The tubular element 695 is slidably received in a conduit 694 in the second plug 692, and extends to the outlet fitting 154 when the first plug 634 is in the closed position (FIG. 17). The tube 696 extends along the length of the tubular element 695, and the outer diameter 697 is less than the exit passage diameter 158. As can be seen in FIG. 18, when the first plug 634 is in the open position, the tubular element 695 is moved downstream and into the exit passage 156. Accordingly, when the first plug 634 is in the open position, the fluid 118 can flow through the ducts 146 In the body 635 and subsequently through the tube 696, to exit via the exit passage 156. It will be appreciated by those skilled in the art that the advantage of the tubular element 695 and the tube 696 therein is that this arrangement tends to result in minimal sharp edges and corners to disrupt the flow of the fluid 118.

Preferably, the attachment portion 693 is a biasing means 690. Because of this, the first plug 634 can move to the open position even if the second plug 692 remains stationary. The biasing means 690, preferably a spring, biases the first plug 634 to the closed position. However, the biasing means 690 is adapted to permit movement of the first plug 634 to the open position upon a pressure force resulting from the pressure differential exerted on the first plug 634 reaching a predetermined pressure.

It will be appreciated by those skilled in the art that the pressure relief device 600 can release the fluid in the event of fire or, alternatively, the pressure relief device 600 can relieve excess pressure resulting from any cause.

Figure 20:
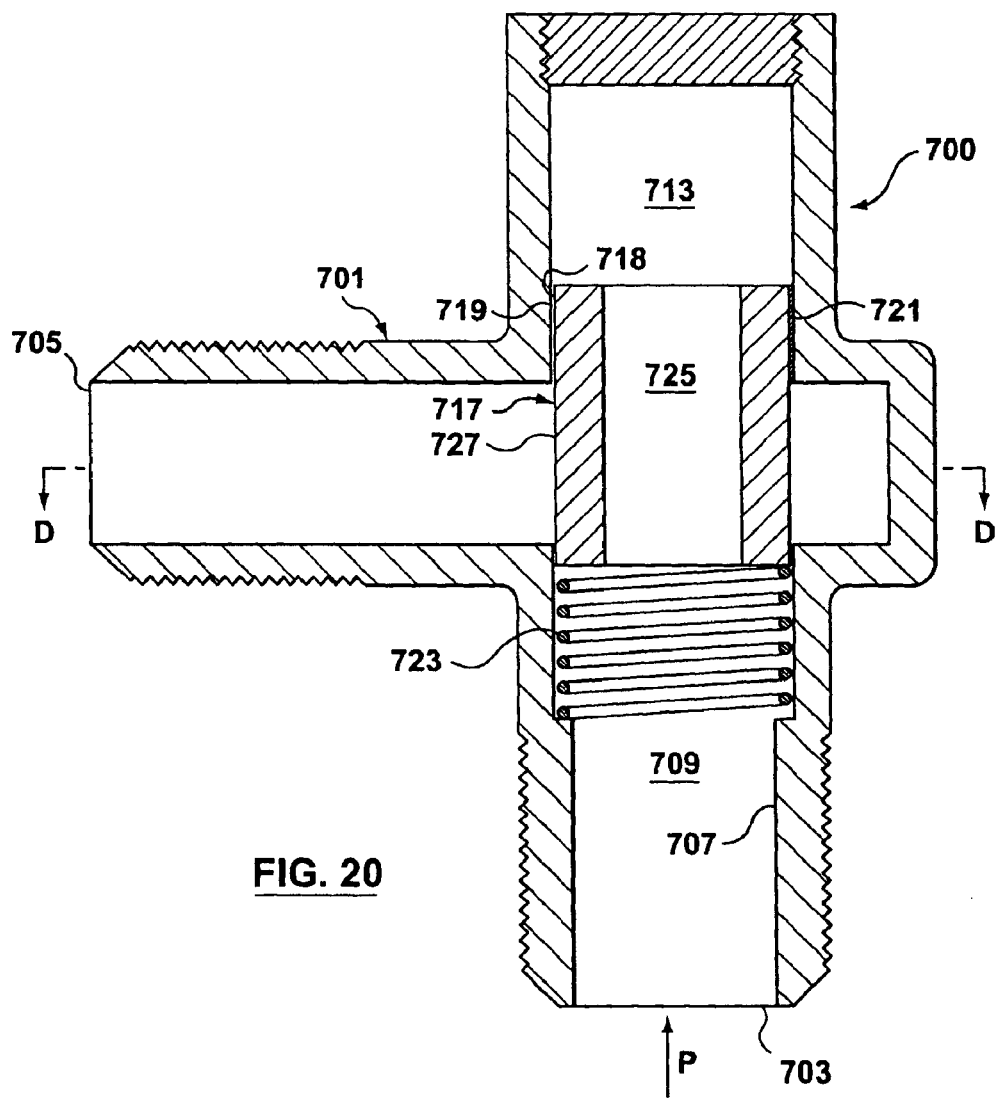
FIG. 20 is a longitudinal section through an alternative embodiment of the pressure relief device showing a plug located in a closed position in a cavity in a housing.
Figure 20A:
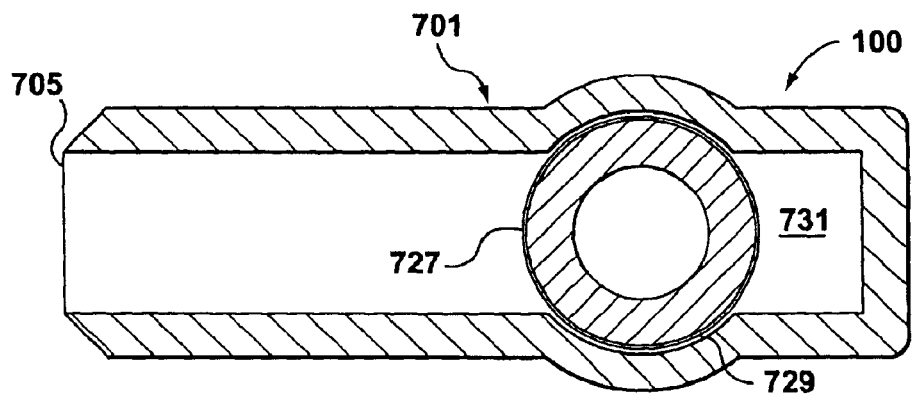
FIG. 20A is a longitudinal section taken along line D—D in FIG. 20.
Figure 21:
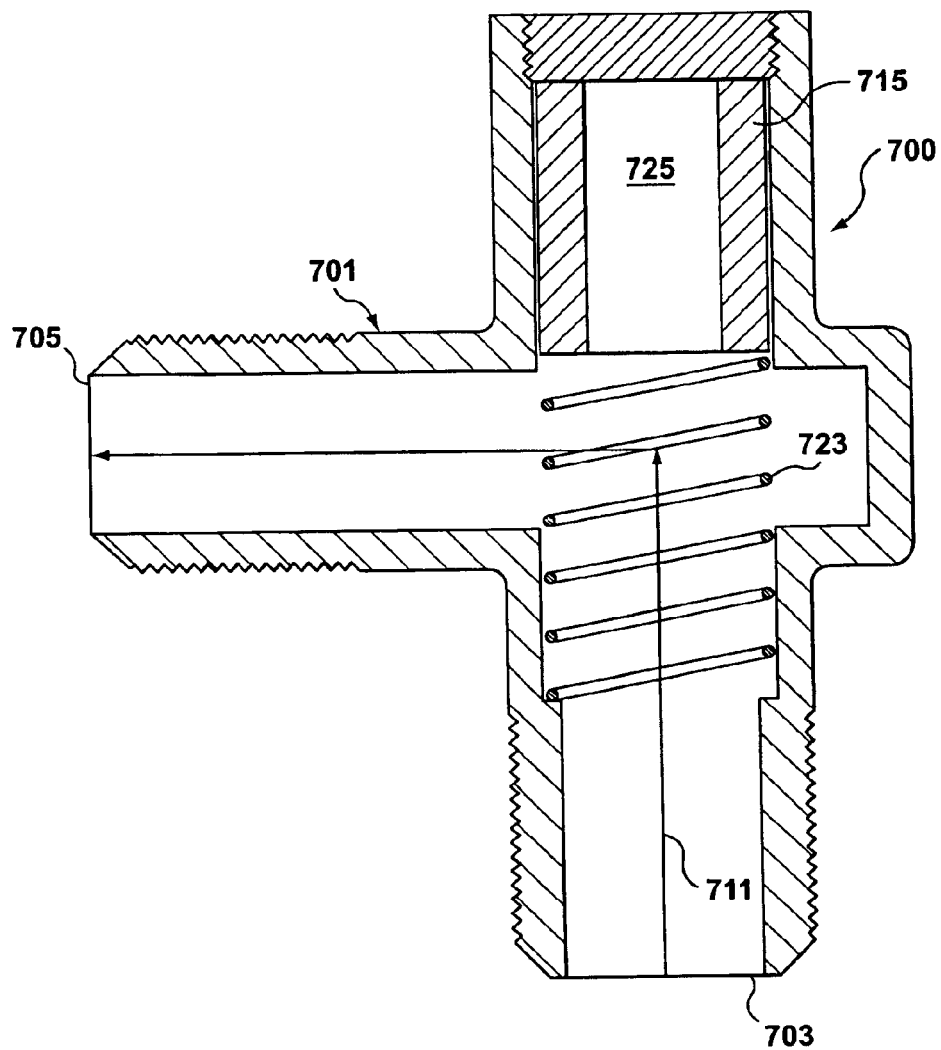
FIG. 21 is a longitudinal section through the pressure relief device of FIG. 20 showing the plug in an open position in the cavity.

Another embodiment 700 of the pressure relief device is shown in FIGS. 20, 20A, and 21. As can be seen in FIG. 20, the pressure relief device 700 includes a housing 701 having an inlet 703, an outlet 705, and an inner wall 707 defining a cavity 709. The cavity 709 includes a passage 711 for flow of fluid between the inlet 703 and the outlet 705. (The passage 711 is schematically represented by an arrow in FIG. 21.) The cavity 709 also includes a chamber 713 contiguous with the passage 711. The inlet 703 is in communication with a fluid (not shown) under pressure in a pressure vessel (not shown).

The pressure relief device 700 also includes a plug 715 positioned in the cavity 709. The plug 715 is movable between a closed position (FIG. 20), in which a flow of the fluid through the passage 711 is blocked, and an open position (FIG. 21), in which the flow of the fluid is permitted through the passage 711 in response to a pressure differential between the inlet 703 and the outlet 705. As can be seen in FIG. 20, the direction in which a pressure force resulting from the pressure differential is directed is indicated by the arrow "P".

The plug 715 includes a plug surface 717 with a contact surface portion 718 adapted to cooperate with the inner wall 707 to define one or more voids 719 between the plug surface 717 and the inner wall 707 when the plug 715 is in the closed position. The pressure relief device 700 also includes a temperature-sensitive bonding material 721 receivable in the void 719. The bonding material 721 is adapted to release the plug surface 717 upon exposure to a predetermined temperature so that the plug 715 is movable from the closed position to the open position.

The bonding material 721 bonds the plug surface 717 to the inner wall 707 to maintain the plug 715 in the closed position until the bonding material 721 is exposed to at least the predetermined temperature. (For convenience, the void 719 is shown on one side of the plug 715 in FIG. 20, and the bonding material 721 is only shown in place on the opposite side of the plug 715. It should be understood that, when the plug 715 is in the closed position, the void 719 is filled with the bonding material 721.)

The pressure relief device 700 also includes a biasing means 723 for urging the plug 715 into the open position.

The biasing means 723 is resistable by the bonding material 721 until the bonding material 721 Is exposed to at least the predetermined temperature. Preferably, the plug 715 includes a plug bore 725 for maintaining communication between the inlet 703 and the chamber 713.

As can be seen in FIG. 20, because of the plug bore 725, the bonding material 721 is not under stress due to the pressure differential. The advantage of this arrangement is that the bonding material 721 is less likely to creep than known pressure relief devices, although the bonding material 721 is, however, under some stress due to the biasing means 723. Typically, more stress results from the pressure differential than from the spring in the conventional pressure relief devices. The plug 715 is "balanced", in the sense that the pressure differential is not acting upon it to urge it to the open position.

The plug surface 717 includes an exposed portion 727 (FIG. 20). FIG. 20A is a longitudinal section of the pressure relief device 700 taken along line D—D in FIG. 20. As can be seen in FIG. 20A, the exposed portion 727 cooperates with the inner wall 707 to define a space 729. It can be seen in FIG. 20A that a second chamber 731 is in communication with the outlet 705 via the space 729 between the exposed portion 727 and the inner wall 707.

Figure 22:
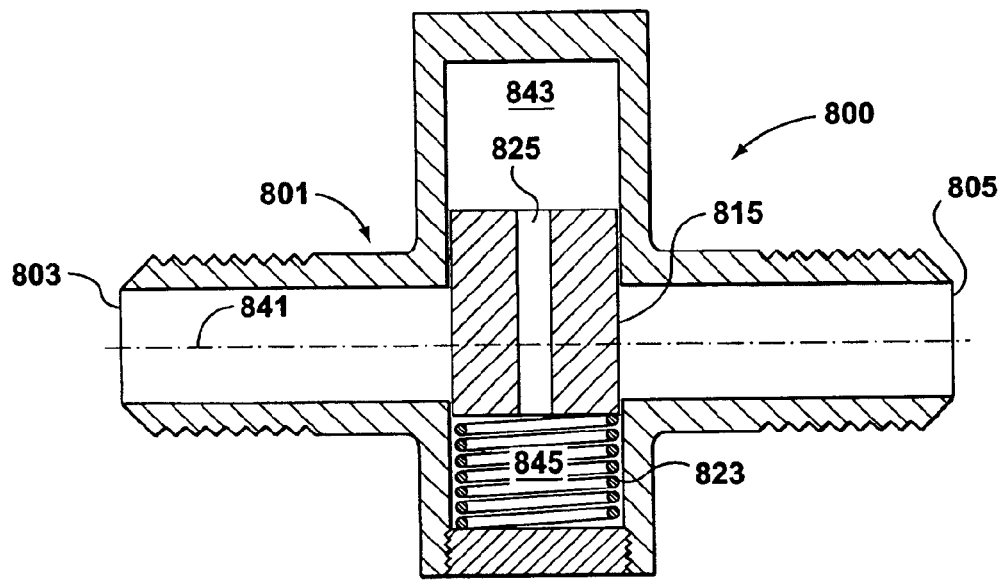
FIG. 22 is a longitudinal section through another alternative embodiment of the pressure relief device showing a plug located in a closed position in a cavity in a housing, drawn at a smaller scale.
Figure 23:
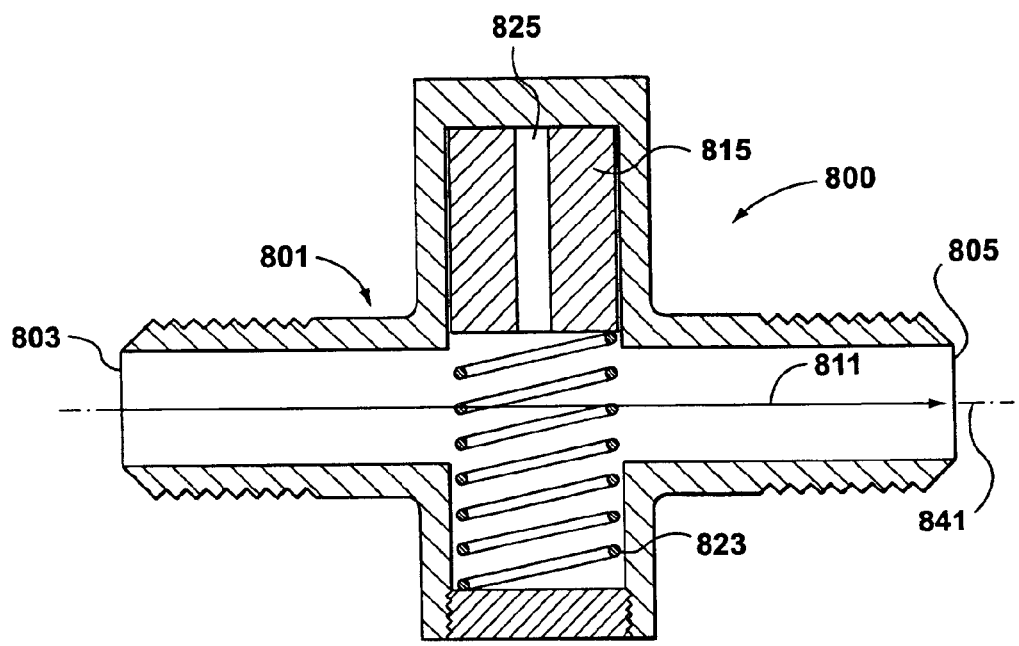
FIG. 23 is a longitudinal section through the pressure relief device of FIG. 22 showing the plug in an open position in the cavity.

Another alternative embodiment 800 of the pressure relief device is shown in FIGS. 22 and 23. In the pressure relief device 800, the passage 811 defines a longitudinal axis 841 (The passage 811 is schematically represented by an arrow in FIG. 23.) The inlet 803 and the outlet 805 are coaxial with the longitudinal axis 841. A first chamber 843 and a second chamber 845 are in communication via a plug bore 825. Because of this, the plug 815 is not urged to the open position, nor is movement of the plug 815 to the open position resisted, due to any pressure differential which might develop between chambers 843 and 845. A plug 815 is movable from a closed position (FIG. 22) to an open position (FIG. 23) upon release of the plug 815 by a bonding material (not shown). The advantage of the pressure relief device 800 is that the flow of the fluid through the passage 811 is substantially linear.

Figure 24:
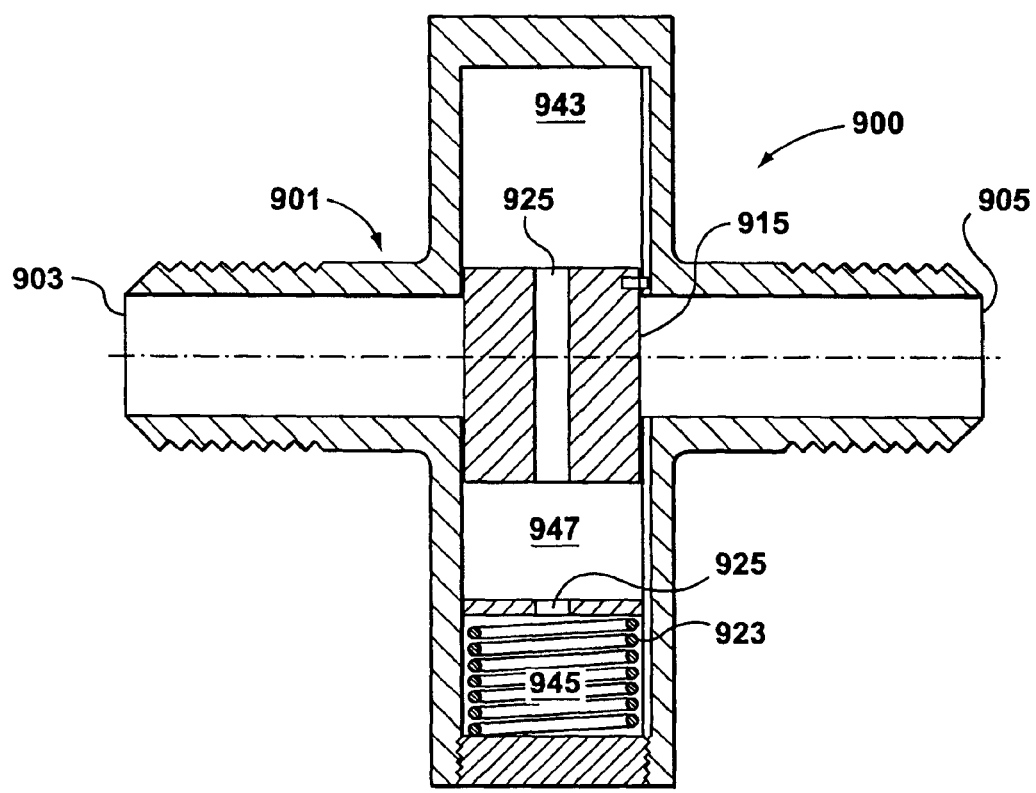
FIG. 24 is a longitudinal section through another alternative embodiment of the pressure relief device showing a plug located in a closed position in a cavity in a housing.
Figure 25:
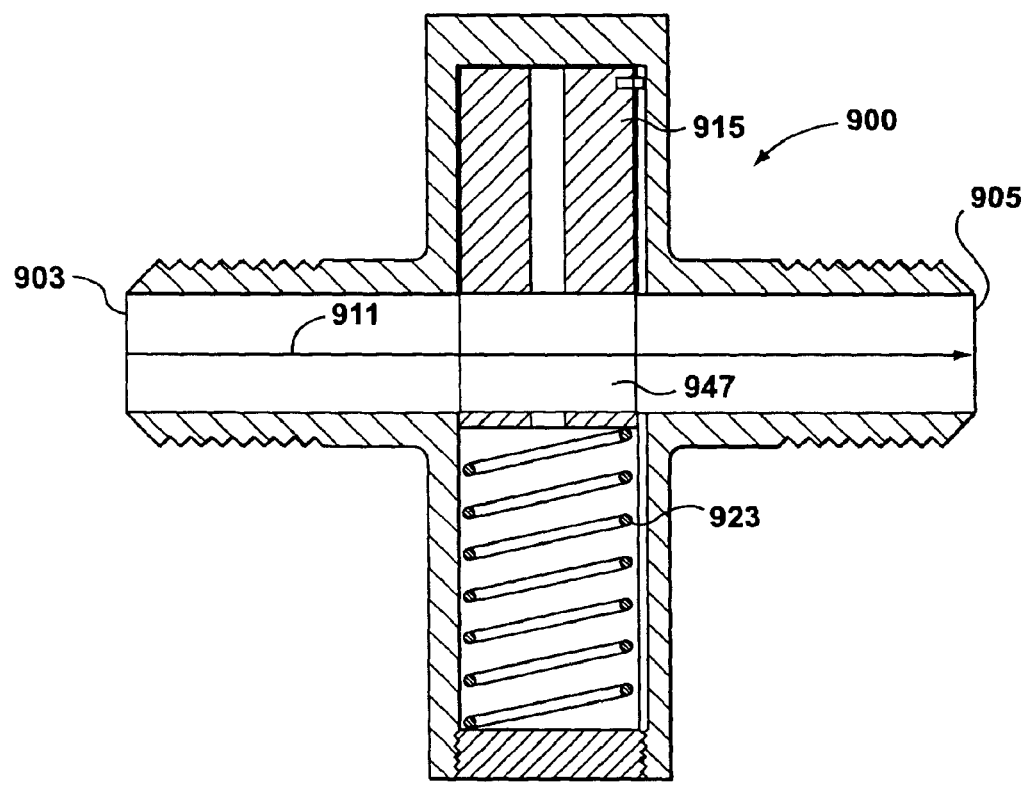
FIG. 25 is a longitudinal section showing the pressure relief device of FIG. 24 showing the plug in an open position in the cavity.

Another alternative embodiment 900 is shown in FIGS. 24 and 25. In the pressure relief device 900, the passage 911 defines a longitudinal axis 941. (The passage 911 is schematically represented by an arrow in FIG. 25.) The inlet 903 and the outlet 905 are coaxial with the longitudinal axis 941. A first chamber 943 and a second chamber 945 are in communication via a plug bore 925, similar to the configuration shown in FIGS. 22 and 23. Because of the plug bore 925, the plug 915 is not urged to the open position, nor is movement of the plug 915 to the open position resisted, due to any pressure differential which might develop between chambers 943 and 945. A plug 915 is movable from a closed position (FIG. 24) to an open position (FIG. 25) upon release of the plug 915 by a bonding material (not shown) securing the plug surface 917 to an inner wall 907.

The plug 915 includes a duct portion 947 which, when the plug 915 is in the open position, is substantially aligned in the passage 911. The advantage of this arrangement is that the flow of the fluid through the passage 911 is substantially linear.

In another alternative embodiment 1000, the pressure relief device has a housing 1001 having an inlet 1003, an outlet 1005, and an inner wall 1007 defining a cavity 1009. The cavity 1009 includes a passage 1011 for flow of fluid between the inlet 1003 and the outlet 1005. The cavity 1009 includes a chamber 1013 contiguous with the passage 1011.

Figure 27:
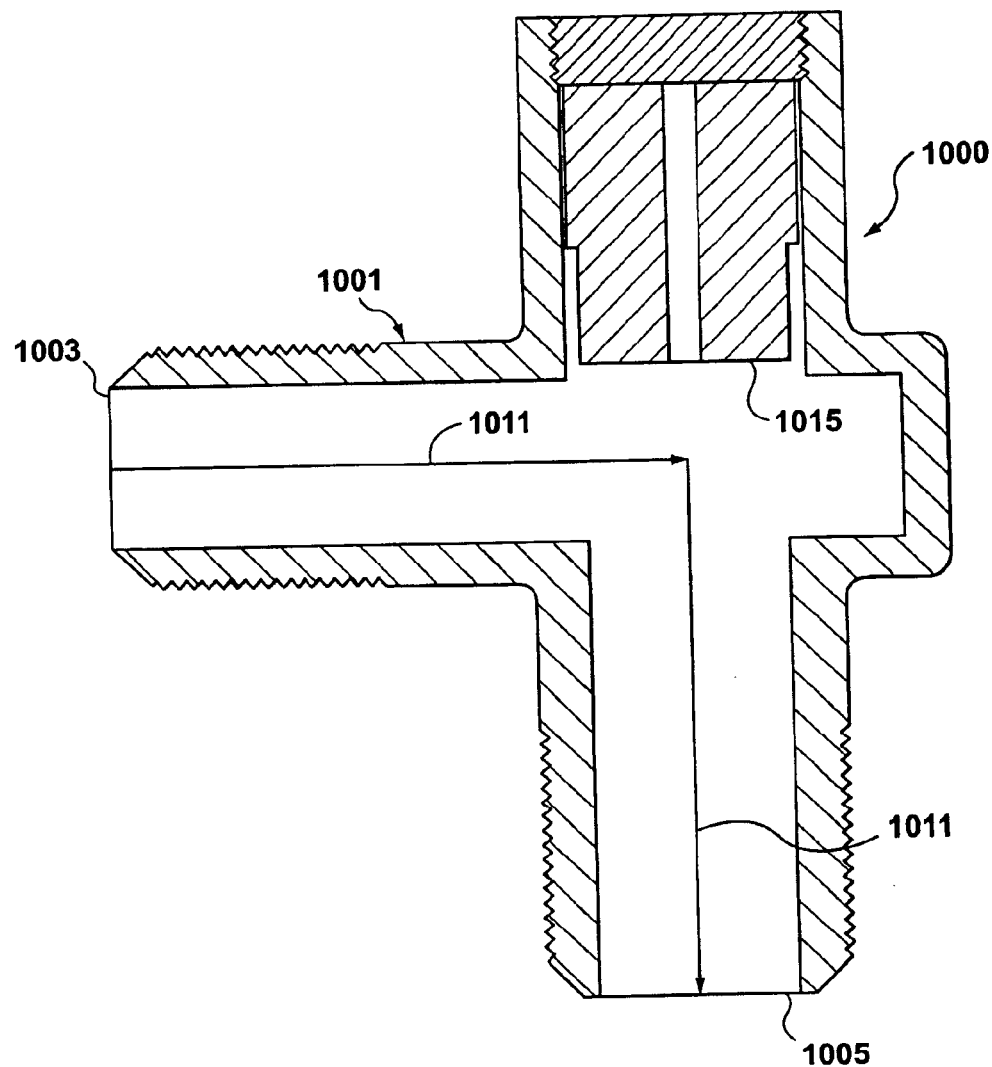
FIG. 27 is a longitudinal section through the pressure relief device of FIG. 26 showing the plug in an open position in the cavity.

(The passage 1011 is schematically represented by an arrow in FIG. 27.) The inlet 1003 is in communication with a fluid under pressure (not shown) in a pressure vessel (not shown).

The pressure relief device 1000 includes a plug 1015 positioned in the cavity 1009. The plug 1015 is movable between a closed position (FIG. 26), in which a flow of the fluid through the passage 1011 is blocked, and an open position (FIG. 27), in which the flow of the fluid is permitted through the passage 1011 in response to a pressure differential between the inlet 1003 and the outlet 1005. The direction in which a pressure force is exerted by the pressure differential upon the plug 1015 is shown by the arrow "P" in FIG. 26.

The plug 1015 includes a plug surface 1017 having a contact surface portion 1018 adapted to cooperate with the inner wall 1007 to define one or more voids 1019 when the plug 1015 is in the closed position.

The plug surface 1017 includes an exposed portion 1027 with a shoulder 1049 thereon. The shoulder 1049 is adapted for directing the pressure force resulting from the pressure differential upon the plug 1015 such that the pressure force urges the plug 1015 to the open position. The pressure relief device 1000 also includes a temperature-sensitive bonding material 1021 receivable in the void 1019. The bonding material 1021 is adapted to release the contact surface portion 1018 upon exposure to a predetermined temperature so that the plug 1015 is movable from the closed position to the open position. The bonding material 1021 bonds the contact surface portion 1018 to the inner wall 1007 and maintains the plug 1015 in the closed position until the bonding material 1021 is exposed to at least the predetermined temperature. (For convenience, the void 1019 is shown on one side of the plug 1015 in FIG. 26, and the bonding material 1021 is only shown in place on the opposite side of the plug 1015. It should be understood that, when the plug 1015 is in the closed position, the void 1019 is filled with the bonding material 1021.)

The plug 1015 includes a plug bore 1025 for maintaining communication between the outlet 1005 and the chamber 1013. Because of the bore 1025, there will not be a pressure differential to impede the movement of the plug 1015 to the open position.

Figure 26:
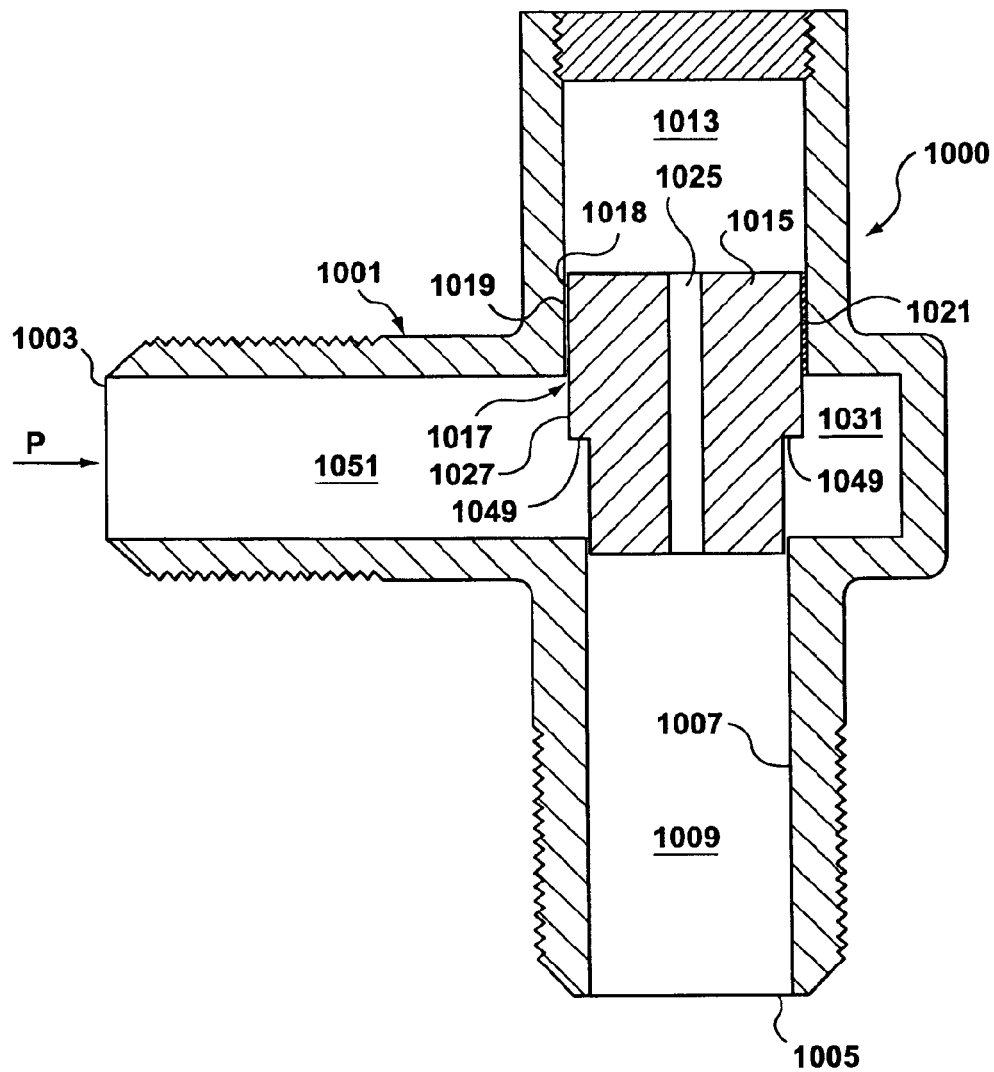
FIG. 26 is a longitudinal section through another alternative embodiment of the pressure relief device showing a plug located in a closed position in a cavity in a housing, drawn at a larger scale.

As can be seen in FIGS. 26 and 27, the cavity 1009 also includes a second chamber 1031. The exposed portion 1027 of the plug surface 1017 cooperates with the inner wall 1007 to define a space (not shown) through which the second chamber 1031 is in communication with the inlet 1003. The pressure force is therefore exerted on the shoulder 1049 in the second chamber 1031 as well as in a portion 1051 of the passage 1011 in communication with the inlet 1003.

It will be evident to those skilled in the art that the invention can take many forms, and that such forms are within the scope of the invention as claimed. Therefore, the spirit and scope of the appended claims should not be limited to the description of the preferred versions contained herein.

I claim:

1. A pressure relief device having:
   a housing including an inlet, an outlet, and an inner wall defining a bore connecting the inlet and the outlet, the bore providing a passage for flow of fluid between the inlet and the outlet;
   the inlet having an inlet diameter and the outlet having an outlet diameter, the inlet diameter being smaller than the outlet diameter, the inlet being in communication with a fluid under pressure in a vessel;
   the bore including an outlet portion with an outlet portion diameter greater than the inlet diameter, the outlet portion extending a first distance from the outlet toward the inlet, an inlet portion with a diameter substantially equal to the inlet diameter extending a second distance from the inlet toward the outlet, and a tapered portion extending between the inlet portion and the outlet portion, the inner wall in the tapered portion defining a substantially frusto-conical surface;
   a plug positioned in the bore and movable from a closed position, in which a flow of the fluid through the passage is blocked, to an open position, in which the flow of the fluid is permitted through the passage in response to a pressure differential between the inlet and the outlet;
   the plug including a tapered contact surface generally defining a conical surface, a contact portion of the conical surface being adapted to cooperate with the frusto-conical surface to define at least one void therebetween when the plug is in the closed position;
   a temperature-sensitive bonding material for bonding the contact portion to the frusto-conical surface, the bonding material being receivable in said at least one void;
   the bonding material being adapted to release the contact portion upon exposure of the bonding material to a predetermined temperature, such that the plug is movable relative to the frusto-conical surface upon release;
   the plug being maintained in the closed position by the bonding material until the bonding material is exposed to at least the predetermined temperature;
   the plug being movable to the open position by the fluid in response to the pressure differential upon the bonding material releasing the contact portion; and
   the plug including at least one duct leading from an inlet port on the conical surface to at least one exit port disposed in an outlet end of the plug disposed proximal to the outlet, said at least one exit port being positioned in the plug to register with the outlet,
   whereby upon the plug moving to the open position, the inlet is in communication with the outlet through said at least one duct.

2. A pressure relief device according to claim 1 additionally including an outlet fitting sealably secured in the bore at the outlet, the outlet fitting including an exit passage with an exit passage diameter, such that the plug is retainable in the bore by the outlet fitting upon movement of the plug to the open position.

3. A pressure relief device according to claim 2 in which the exit passage diameter is smaller than the outlet diameter and larger than the inlet diameter.

4. A pressure relief device according to claim 2 in which the outlet end of the plug includes a guide portion adapted for guiding the plug from the closed position to the open position such that said at least one exit port registers with the exit passage when the plug is in the open position.

5. A pressure relief device according to claim 1 in which the plug includes a nose cone portion positioned upstream of the conical surface and adapted for minimal disruption of the flow of the fluid through the passage when the plug is in the open position.

6. A pressure relief device according to claim 1 in which said at least one duct is positioned for minimal disruption of the flow of the fluid through the passage when the plug is in the open position.

7. A pressure relief device according to claim 1 in which the bore defines a longitudinal axis, the inlet and the outlet being coaxial with the longitudinal axis, and said at least one duct is positioned for minimal deviation of flow of the fluid through the passage from a direction parallel to the longitudinal axis when the plug is in the open position.

8. A pressure relief device according to claim 1 in which said at least one duct is configured to define a duct flow path included in the passage adapted for minimal changes in direction of the flow of the fluid through the passage when the plug is in the open position.

9. A pressure relief device according to claim 1 additionally including a plug longitudinal axis defined by the plug, the plug including four ducts with respective inlet ports disposed angularly equidistant from each other around the plug longitudinal axis.

10. A pressure relief device according to claim 9 in which the plug includes a cone portion having an upstream cone surface, the tapered contact surface of the plug is positioned at a first angle relative to the longitudinal axis, and the upstream cone surface is positioned at a second angle relative to the longitudinal axis, the second angle being greater than the first angle.

11. A pressure relief device according to claim 1 in which the bonding material is a eutectic alloy.

12. A pressure relief device according to claim 1 in which the predetermined temperature is selected from the group consisting of approximately 100° C. and approximately 150° C.

13. A pressure relief device according to claim 1 in which, when the plug is in the open position, the passage has a passage cross-sectional area varying along the passage from the inlet to the outlet, the passage cross-sectional area downstream from the inlet portion being greater than the inlet diameter.

* * * * *